US 9,879,592 B2

(12) United States Patent
Leroy et al.

(10) Patent No.: US 9,879,592 B2
(45) Date of Patent: Jan. 30, 2018

(54) METHOD OF CONTROLLING A COMBUSTION ENGINE EQUIPPED WITH DOUBLE SUPERCHARGING

(71) Applicant: IFP Energies nouvelles, Rueil-Malmaison (FR)

(72) Inventors: Thomas Leroy, Saint Germain en Laye (FR); Jonathan Chauvin, Paris (FR); Alexandre Chasse, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 97 days.

(21) Appl. No.: 14/427,480

(22) PCT Filed: Aug. 12, 2013

(86) PCT No.: PCT/FR2013/051928
§ 371 (c)(1),
(2) Date: Mar. 11, 2015

(87) PCT Pub. No.: WO2014/041271
PCT Pub. Date: Mar. 20, 2014

(65) Prior Publication Data
US 2015/0247447 A1 Sep. 3, 2015

(30) Foreign Application Priority Data

Sep. 11, 2012 (FR) .................. 12 02420

(51) Int. Cl.
*F02B 37/04* (2006.01)
*F02B 29/04* (2006.01)
(Continued)

(52) U.S. Cl.
CPC .......... *F02B 37/04* (2013.01); *F02B 29/0406* (2013.01); *F02B 37/002* (2013.01);
(Continued)

(58) Field of Classification Search
CPC ........ F02B 37/04; F02B 39/04; F02B 37/002; F02B 29/0406; F02B 37/16; F02M 26/23;
(Continued)

(56) References Cited

U.S. PATENT DOCUMENTS 7,529,615 B2 * 5/2009 Milos .................. F02B 37/16
123/361
2005/0056012 A1 * 3/2005 Wild .................. F02B 37/04
60/602
(Continued)

FOREIGN PATENT DOCUMENTS

DE 102006062213 A1 6/2008
DE 102007022703 B3 11/2008
(Continued)

OTHER PUBLICATIONS

Canova, M. et al: "Design and Validation of a Control-oriented Model of a Diesel Engine with Two-Stage Turbocharger", SAE International Fuels and Lubricants Meeting and Exposition, XX, XX, vol. 2, No. 2, Sep. 13, 2009 (Sep. 13, 2009), pp. 387-397, XP002670239.
(Continued)

*Primary Examiner* — Patrick Maines
(74) *Attorney, Agent, or Firm* — Fitch, Even, Tabin & Flannery LLP

(57) ABSTRACT

The invention relates to a method for controlling a combustion engine (1) equipped with a supercharging system, comprising a turbocharger (2) and a mechanical compressor (3) and a bypass circuit disposed in parallel with the mechanical compressor comprising a controlled bypass valve (4). The method includes:
a) acquiring a boost pressure setpoint $P_{sural}^{sp}$;
b) converting the boost pressure setpoint $P_{sural}^{sp}$ into an opening setpoint Bypass$^{sp}$ of the bypass valve (4) using a filling model modelling the filling of the supercharg-
(Continued)

Figure 3 ing boost volume between the intake valves of the engine (1) and the mechanical compressor (3) and bypass valve (4); and c) controlling the bypass valve (4) is according to the opening setpoint $Bypass^{sp}$ of the bypass valve.

24 Claims, 13 Drawing Sheets

(51) Int. Cl.
| | |
|---|---|
| F02B 37/16 | (2006.01) |
| F02D 41/00 | (2006.01) |
| F02D 21/08 | (2006.01) |
| F02B 37/00 | (2006.01) |
| F02M 26/06 | (2016.01) |
| F02M 26/23 | (2016.01) |
| F02B 39/04 | (2006.01) |

(52) U.S. Cl.
CPC ............ F02B 37/16 (2013.01); F02D 21/08 (2013.01); F02D 41/0007 (2013.01); F02M 26/06 (2016.02); F02M 26/23 (2016.02); *F02B 39/04* (2013.01); *F02D 2200/0402* (2013.01); *F02D 2200/0406* (2013.01); *F02D 2200/0414* (2013.01); *Y02T 10/144* (2013.01); *Y02T 10/146* (2013.01)

(58) Field of Classification Search
CPC ..... F02M 26/06; Y02T 10/146; Y02T 10/144; F02D 2200/0402; F02D 21/08; F02D 41/0007; F02D 2200/0406; F02D 2200/0414
USPC ......................................................... 60/612
See application file for complete search history.

(56) References Cited

U.S. PATENT DOCUMENTS

| | | | | |
|---|---|---|---|---|
| 2007/0175215 | A1* | 8/2007 | Rowells | F02B 29/0418 60/605.2 |
| 2008/0034751 | A1 | 2/2008 | Jorgensen | |
| 2008/0110170 | A1* | 5/2008 | Noodt | F02B 37/04 60/611 |
| 2008/0148828 | A1 | 6/2008 | Milos et al. | |
| 2009/0259388 | A1* | 10/2009 | Vetrovec | F02B 33/40 701/103 |
| 2010/0152992 | A1 | 6/2010 | Burkhardt | |
| 2012/0079823 | A1 | 4/2012 | Son et al. | |
| 2013/0125544 | A1* | 5/2013 | Mond | F02D 23/00 60/611 |
| 2013/0282256 | A1* | 10/2013 | Watanuki | F02D 23/02 701/102 |
| 2015/0240826 | A1* | 8/2015 | Leroy | F04D 27/009 415/1 |
| 2015/0315960 | A1* | 11/2015 | Thomas | F02B 37/04 123/564 |
| 2016/0245155 | A1* | 8/2016 | Iwata | F02B 37/10 |

FOREIGN PATENT DOCUMENTS

| | | | |
|---|---|---|---|
| DE | 102008034323 A1 | 2/2010 | |
| EP | 1398470 A1 | 3/2004 | |
| EP | 1475524 A1 | 11/2004 | |
| FR | 2949140 A1 | 2/2011 | |
| JP | WO 2017002254 A1 * | 1/2017 | ............ F02D 41/04 |
| WO | 2008017952 A1 | 2/2008 | |

OTHER PUBLICATIONS

International Search Report for International Application No. PCT/FR2013/051928 dated Nov. 6, 2013.

* cited by examiner

METHOD OF CONTROLLING A COMBUSTION ENGINE EQUIPPED WITH DOUBLE SUPERCHARGING

CROSS REFERENCE TO RELATED APPLICATIONS

Reference is made to French Patent Application Serial No. 12/02420, filed on Sep. 11, 2012 and PCT/FR2013/051928, filed Aug. 12, 2013, which applications are incorporated herein by reference in their entirety.

BACKGROUND OF THE INVENTION

Field of the Invention

The present invention relates to control of combustion engines, particularly combustion engines equipped with double supercharging.

Description of the Prior Art

The supercharging of an engine increases the quantity of air and fuel mixture within the cylinders of the engine in comparison with normal operation. Supercharging, and especially double supercharging, make it possible to increase the efficiency of a combustion engine without changing the rotational speed. This is because engine torque (and therefore power) is dependent on the angle formed between the connecting rod and the crankshaft, on the pressure of the gases inside the cylinder, referred to as the Mean Effective Pressure (or MEP) and on the pressure of the amount of fuel introduced. For example, for a gasoline engine, if the amount of gasoline introduced into the cylinder is increased, then the mass of air (oxidizer) must also be increased proportionately in order to ensure complete combustion of this fuel (the same air/fuel ratio is maintained).

In order to obtain this supercharging, the mass of gas on the intake side is increased, making it possible to increase the quantity of fuel. In order to do that, the gaseous mixture on the intake side of the engine (essentially comprising air and optionally burnt gases) is compressed. This compression may be performed by the compressor of a turbocharger driven by the exhaust gases by a turbine, or compression may be performed by a separate mechanical compressor which may be driven by the engine crankshaft. Double supercharging is referred to when the gaseous mixture on the intake side is compressed twice: for example, a first time by a compressor of the turbocharger and a second time by a mechanical compressor located in the engine intake circuit. Conventionally, the mechanical compressor, which is dynamically controlled, compensates for the inertia of the turbocharger.

In order to control the pressure of the air on the intake side, referred to as the boost pressure, it is possible to alter the way in which the two compressors behave. On the one hand, in order to control the air passing through the mechanical compressor, a bypass valve is controlled, which is positioned in parallel with the compressor and diverts the air toward the compressor according to its openness, which is controlled. Furthermore, when the compressor is driven by the engine crankshaft, a controlled clutch is inserted between a reduction gear and the mechanical compressor. The clutch allows the mechanical compressor to be activated or deactivated. Conventionally, the mechanical compressor is deactivated for high engine speeds (the limiting speed is dependent on the drive ratio between the crankshaft and the mechanical compressor). On the other hand, in order to control the compression of air by the turbocharger the turbocharger is equipped with a variable geometry turbine (VGT) having controlled variation of its geometry which leads to a change in the rotational speed of the turbocharger and therefore a change in the compression.

At steady speeds, a mechanical compressor appears very costly from an energy standpoint when connected directly to the crankshaft. Doing this results in an increase in engine fuel consumption.

From a transient standpoint, it would appear that the boost pressure is the result of two parameters controlled by the VGT turbine and the bypass valve, which are: the pressure downstream of the turbocharger (that is upstream of the mechanical compressor) and the compression ratio of the mechanical compressor. These two parameters have different response times as a result of the pressure upstream of the mechanical compressor is slow in comparison with the compression ratio of the mechanical compressor because of the inertia of the turbocharger. Control of the double supercharging needs to operate the two components in such a way as to ensure rapid response.

A method for controlling the double supercharging must therefore meet the following three objectives:
  Ensure the boost pressure required in order to achieve the load demanded by the driver. This regulation needs to be as rapid as possible and result neither in fluctuation or significant overshoot (for example by more than 150 mbar).
  Adhere to the operating point that is optimal from a fuel consumption standpoint, so that the mechanical compressor is deactivated when it is not needed for reaching the required pressure.
  Be robust with respect to the spread on the various sensors and components of the supercharging system, in order to continue to meet the specifications when such spread is present.

Patent EP 1 844 222 B1 describes a combustion engine equipped with double supercharging and a method for controlling the double supercharging. The engine described in that document comprises an additional controlled valve between the turbocharger and the mechanical compressor, making the system more complex to produce and to control (because the number of actuators to be controlled is higher). Furthermore, the control method described in that document does not take the physical behavior of the gas flow rates on the intake side into consideration.

In order to respond to these problems, the invention relates to a method for controlling a combustion engine equipped with double supercharging, in which the bypass valve is controlled by determining an opening setpoint for the bypass valve using a filling model that models the filling of the supercharging boost volume.

SUMMARY OF THE INVENTION

The model allows the physical behavior of the gas flow rates on the intake side to be taken into consideration. In addition, the open setpoint of the bypass valve allows the double supercharging to be controlled rapidly, robustly and in a way that is optimal in relation to energy.

The invention relates to a method for controlling a combustion engine equipped with a supercharging system, comprising a turbocharger and a mechanical compressor for compressing a gaseous mixture on the intake side of the engine and a bypass circuit arranged in parallel with the mechanical compressor comprising a controlled bypass valve. For this method, the following steps are carried out:

a) acquiring a boost pressure setpoint $P_{sural}^{sp}$;

b) converting the boost pressure setpoint $P_{sural}^{sp}$ into an openness setpoint $Bypass^{sp}$ for the opening of the bypass valve by use of a filling model that models the filling of the supercharging boost volume between the intake valves of the engine and the mechanical compressor and bypass valve; and c) controlling the bypass valve according to the opening setpoint $Bypass^{sp}$ of the bypass valve.

According to the invention, a pressure $P_{avcm}$ and a temperature $T_{avcm}$ upstream of the mechanical compressor and a boost pressure $P_{sural}$ and boost temperature $T_{sural}$ on the intake side of the engine, the filling model that models the filling of the supercharging boost volume linking the boost pressure $P_{sural}$ to the openness Bypass of the bypass valve by the pressure $P_{avcm}$ and the temperature $T_{avcm}$ upstream of the mechanical compressor as well as the boost temperature $T_{sural}$ are determined.

Advantageously, the boost pressure $P_{sural}$ and boost temperature $T_{sural}$ are determined by respective pressure and temperature sensors arranged upstream of the intake manifold of the engine.

According to one embodiment of the invention, the pressure $P_{avcm}$ and the temperature $T_{avcm}$ upstream of the mechanical compressor are determined by the respective pressure and temperature sensors located upstream of the mechanical compressor.

As an alternative, the pressure $P_{avcm}$ and the temperature $T_{avcm}$ upstream of the mechanical compressor are determined by an estimator dependent on the boost pressure $P_{sural}$ and boost temperature $T_{sural}$.

Furthermore, the mechanical compressor is driven by the crankshaft of the engine by a reduction gear and a clutch) controlled as a function of the opening setpoint $Bypass^{sp}$ of the bypass valve.

Alternatively, the mechanical compressor is driven by an electric motor.

Advantageously, the clutch is controlled by carrying out the following steps:

i) determining the engine speed Ne; and ii) controlling the clutch so that:

engaging the clutch if the opening setpoint $Bypass^{sp}$ for the bypass valve corresponds to incomplete opening of the valve and if the engine speed Ne is below a predetermined threshold then the clutch is engaged;

if not, the clutch is disengaged.

Advantageously, the predetermined threshold is determined as a function of the maximum speed of the mechanical compressor and the reduction ratio $r_{cm}$ between the crankshaft and the mechanical compressor.

According to the invention, the filling model is determined by a filling equation regarding the filling of the supercharging boost volume defined by a conservation-of-flow rates formula as follows:

$$\dot{P}_{sural} = \frac{RT_{sural}}{V_{sural}}(D_{cm} - D_{bp} - D_{asp})$$

where $\dot{P}_{sural}$ is the first derivative of the boost pressure $P_{sural}$ with respect to time, R is the perfect gas constant, $V_{sural}$ is the supercharging boost volume, $D_{cm}$ is the flow rate arriving from the mechanical compressor, $D_{bp}$ is the flow rate leaving through the bypass valve which is a function of the openness of the bypass valve and $D_{asp}$ is the aspirated flow rate leaving toward the cylinders of the engine.

For preference, the flow rate $D_{bp}$ leaving through the bypass valve (4) is determined by a pressure drop relationship at the bypass valve (4), notably by a Barré Saint Venant equation written as follows:

$$D_{bp} = A_{bp}(Bypass) \times f(P_{avcm}, P_{sural}, T_{avcm})$$

where $A_{bp}^{(Bypass)}$ is the area of opening of the bypass valve and f is the flow rate per unit area defined by a formula of the type:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is a ratio of mass heat capacities of the gases.

According to one embodiment of the invention, the filling model is an open-loop filling model which can be written in the form of a relationship as follows:

$$Bypass^{sp} = A_{bp}^{-1}\left(\frac{1}{f(P_{avcm}, P_{sural}, T_{avcm})}\right.$$

$$\left.\left(-\frac{V_{sural}}{RT_{sural}}\dot{P}_{sural}^{sp} + \phi\left(r_{cm} \times Ne, \frac{P_{sural}^{sp} + \delta P(r_{cm} \times Ne, \rho_{cm})}{P_{avcm}}\right)\rho_{cm} - D_{asp}^{sp}\right)\right)$$

where $r_{cm}$ is the reduction ratio between the mechanical compressor and the crankshaft, $\rho_{cm}$ is the density of the gases passing through the mechanical compressor as given by $$\rho_{cm} = \frac{P_{acvm}}{RT_{acvm}},$$

$\varphi$ is the volumetric flow rate of the mechanical compressor, $D_{asp}^{sp}$ is the setpoint for the flow rate of gas aspirated by the cylinders of the engine, and $\delta P$ is the pressure drop in an air cooler located between the turbocharger and the mechanical compressor.

Alternatively, the filling model is a closed-loop filling model which can be written in the form of a relationship as follows:

$$Bypass^{sp} = A_{bp}^{-1}\left(\frac{1}{f(P_{avcm}, P_{rural}^{sp}, T_{avcm})}\left(-\frac{V_{sural}}{RT_{sural}}\dot{P}_{sural}^{sp} + \right.\right.$$

$$\left.\left.\delta_{PI} + \phi\left(r_{cm} \cdot N_e, \frac{P_{sural}^{sp} + \delta P(r_{cm} \cdot N_e, \rho_{cm})}{P_{avcm}}\right)\rho_{cm} - D_{asp}^{sp}\right)\right)$$

where $$\delta_{PI} = -K_p(P_{sural} - P_{sural}^{sp}) - K_i\int_0^t(P_{sural} - P_{sural}^{sp})dt$$

$r_{cm}$ is a reduction ratio between the mechanical compressor and the crankshaft, $\rho_{cm}$ is the density of the gases passing through the mechanical compressor as given by $$\rho_{cm} = \frac{P_{acvm}}{RT_{acvm}},$$

φ is the volumetric flow rate of the mechanical compressor, $D_{asp}^{sp}$ is the setpoint for the flow rate of gas aspirated by the cylinders of the engine, δP is the pressure drop in an air cooler sited between the turbocharger and the mechanical compressor, and $K_i$ and $K_p$ are calibration parameters for the feedback loop.

BRIEF DESCRIPTION OF THE DRAWINGS

Other features and advantages of the method according to the invention will become apparent from reading the description hereinafter of nonlimiting embodiments, with reference to the attached figures described hereinafter.

DETAILED DESCRIPTION OF THE INVENTION

Figure 1:
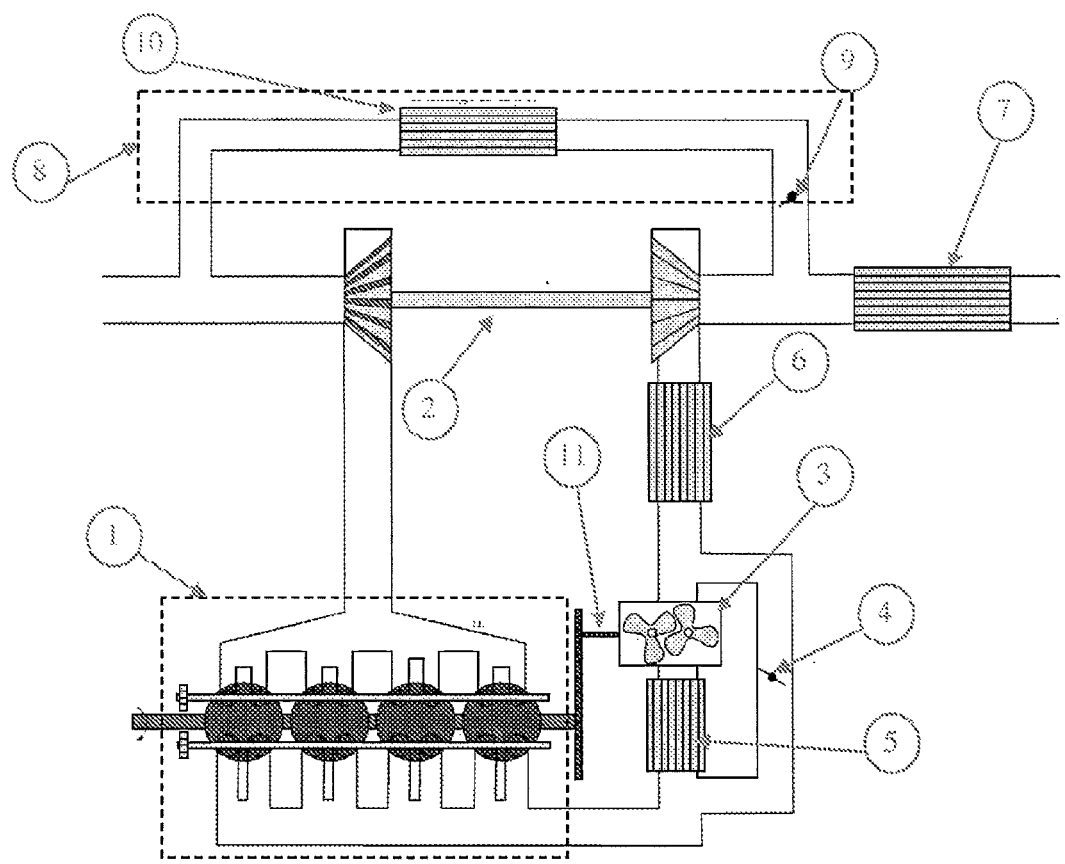
FIG. 1 illustrates a combustion engine equipped with double supercharging.

The method according to the invention allows control of an engine provided with double supercharging comprising a compressor of a turbocharger and a mechanical compressor mounted in parallel with a bypass valve. FIG. 1 depicts a combustion engine equipped with double supercharging which can be controlled using the method according to the invention. An engine (1) is equipped with an intake circuit and with an exhaust circuit. Arranged in the intake circuit in the direction in which the air circulates are an air filter (7), the compressor of the turbocharger (2), a first charge air cooler (6), a mechanical compressor (3) and a second charge air cooler (5). Arranged in parallel with the mechanical compressor is a diverting circuit referred to as a bypass circuit, comprising a bypass valve (4). In the exhaust circuit is the turbine of the turbocharger (2), which has a variable geometry turbine (VGT). According to the embodiment of FIG. 1, the mechanical compressor (3) is driven by the crankshaft of the engine (1) via a transmission, notably a belt, and by a clutch (11). Alternatively, and according to an embodiment which has not been depicted, the mechanical compressor (3) may be driven by a controlled electric motor. The charge air coolers (5 and 6) allow the air that has become heated during successive compressions to be cooled.

In addition, as depicted, the engine may comprise an exhaust gas recirculation (EGR) circuit (8) comprising a cooler (10) and an EGR valve (9). The circulating burnt gases mix with the fresh air between the air filter (7) and the compressor of the turbocharger (2). The engine (1) as depicted comprises four cylinders. These last two features (EGR and number of cylinders) are independent of the control method according to the invention and are nonlimiting.

The method according to the invention is also suited to a combustion engine provided with a double supercharging for which the mechanical compressor is driven for example by an electric motor.

Figure 2:
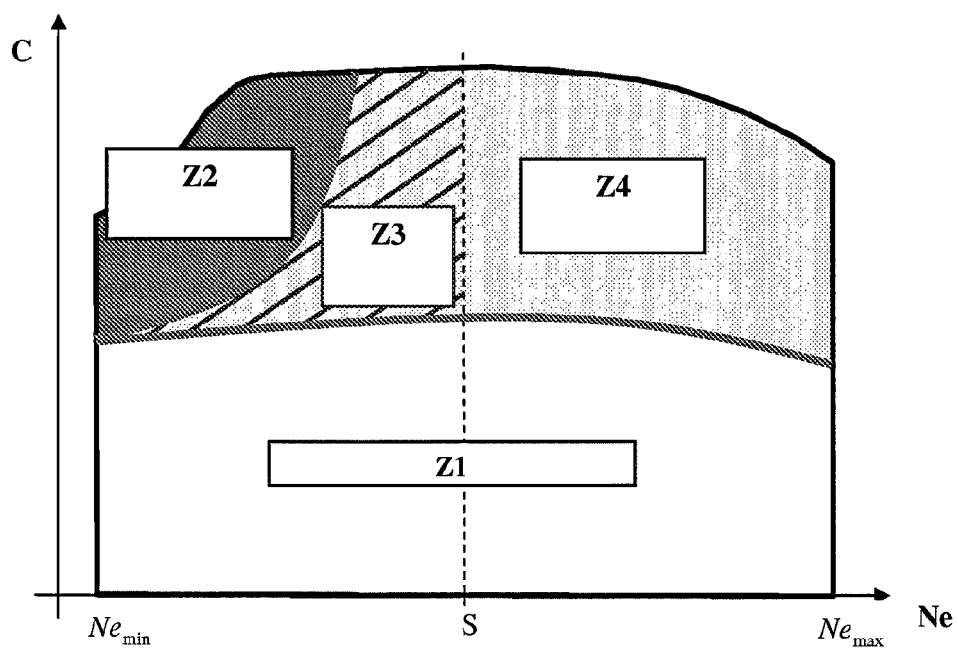
FIG. 2 illustrates zones of use of a mechanical compressor in an engine speed, torque plane.

FIG. 2 shows, in a diagram of torque C as a function of engine speed Ne, various zones of use of the double supercharging. In zone Z1, for low torques, the operation is naturally aspirated; which means that the intake pressure is atmospheric pressure, which corresponds to the conventional operation of the combustion engine without supercharging. In zone Z2, at low speed, the turbocharger is not enough to increase the boost pressure and use is made of the bypass valve, with the VGT actuator then being positioned for optimum efficiency of the turbomachine. To reduce fuel consumption, when possible, the mechanical compressor is used as little as possible, that is charging is performed using the turbocharger via the VGT actuator (zone Z4). In the hatched zone Z3, the mechanical compressor is used only for transient speeds in order to compensate for turbo lag. In this figure, S denotes a predetermined threshold beyond which the mechanical compressor is not used, S is determined as a function of the maximum speed admissible by the mechanical compressor (which comes from manufacturer data) and of features of the reduction ratio between the crankshaft and the mechanical compressor. This threshold S can be chosen substantially equal to 3000 rpm.

The method according to the invention relates to the control of a combustion engine equipped with double supercharging. To control the combustion engine, the following steps are carried out:

1) Determining the pressures and temperatures within the intake circuit.
2) Acquiring a boost pressure setpoint.
3) Providing a filling model.
4) Calculating the opening setpoint for the bypass valve.
5) Controlling the bypass valve.
6) Activating the mechanical compressor.

The last step of activating the mechanical compressor is an optional step which is used only if the mechanical compressor is driven by the engine crankshaft by a clutch.

The terms upstream and downstream are defined with respect to the direction in which the gases flow on the intake side and on the exhaust side. In addition, the following notations are used:

$P_{avcm} = T_{avcm}$ is the pressure and the temperature upstream of the mechanical compressor (3), on the outlet side of the first charge air cooler (6).

$P_{sural}$, $T_{sural}$ is the boost pressure and the temperature on the intake side of the engine (1) and downstream of the mechanical compressor (3).

$V_{sural}$ is the supercharging boost volume between the intake valves of the engine (1) and the mechanical compressor (3) and bypass valve (4).

$P_{avcm}$ is the pressure downstream of the mechanical compressor (3) and upstream of the second charge air cooler (5).

Bypass is the position of opening of the bypass valve (4).

$N_e$ is the speed of the engine (1).

$V_{sural}$ is the supercharging boost volume between the intake valves of the engine and the mechanical compressor (3) and bypass valve (4).

R is the specific perfect gas constant which is the same for all the gases involved here (air and exhaust gases), and which is equal to 288 J/kg/K.

$D_{cm}$ is the mass flow rate of air leaving the mechanical compressor (3).

$D_{bp}$ is the mass flow rate of air passing through the bypass valve (4).

$D_{asp}$ is the mass flow rate of air aspirated by the cylinders of the engine (1).

$A_{bp}$ is the area of opening of the bypass valve (4).

γ is the ratio of the mass heat capacities of the gases which for the gaseous mixture (air and exhaust gas) equals γ=1.4.

$r_{cm}$ is the reduction ratio between the mechanical compressor (3) and the crankshaft (when the mechanical compressor is driven by the engine).

$\rho_{cm}$ is the density of the gases passing through the mechanical compressor (3), given by the relationship:

$$\rho_{cm} = \frac{P_{acvm}}{RT_{acvm}}.$$

φ is the volumetric flow rate of the mechanical compressor (3). The volumetric flow rate is obtained from a map which may form part of the data supplied by the supplier of the mechanical compressor (3).

δP is the pressure drop across the charge air cooler (6) situated between the turbocharger (2) and the mechanical compressor (3). The pressure-drop term is mapped as a function of the speed of the mechanical compressor and of the density of the gases.

$K_i$ and $K_p$ are calibration parameters for the feedback loop for the closed-loop embodiment.

MEP is the mean effective pressure corresponding to the ratio between the work supplied by the engine (1) during a cycle and the cylinder capacity of the engine (1).

VGT is the opening of the turbine of the turbocharger (2).

Notations, with the suffix $-^{sp}$, represent setpoints associated with the parameters concerned; the suffix $-^{mes}$ indicates measured values; the suffix $-^{nom}$ indicates nominal values; and the suffix $-^{disp}$ corresponds to values with spread. The first derivative with respect to time is indicated by a dot above the variable concerned.

Figure 3:
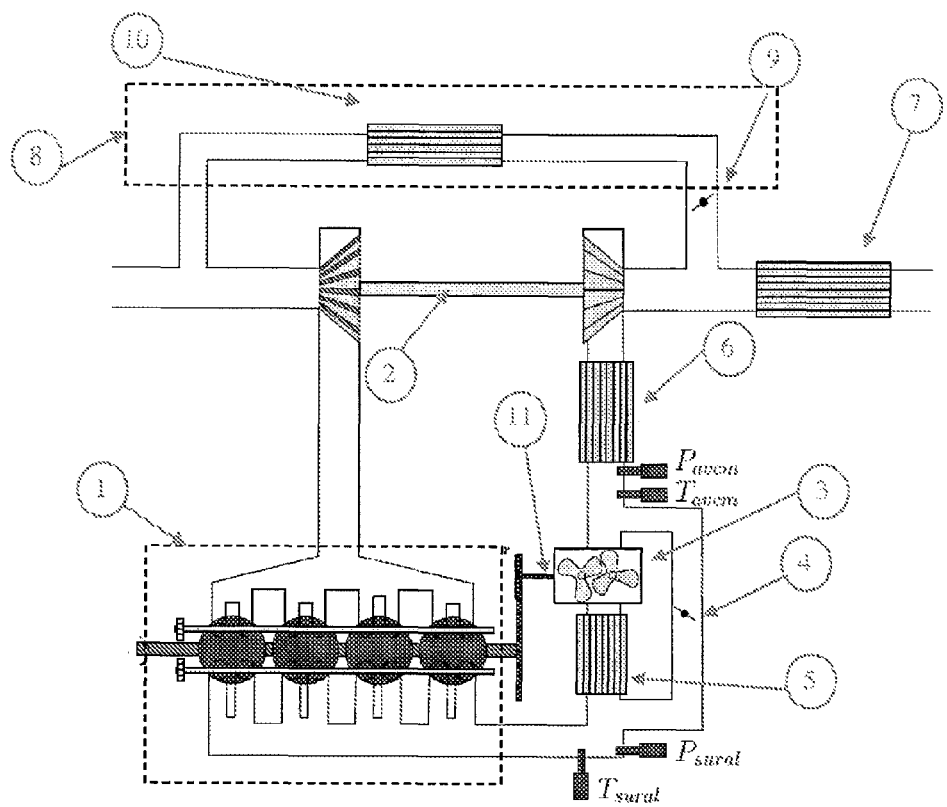
FIG. 3 illustrates a combustion engine with instrumentation according to one embodiment of the invention.

In the remainder of the description and for FIGS. 1 and 3, a mechanical compressor (3) is driven by the crankshaft of the combustion engine (1), although the method according to the invention is equally valid for a mechanical compressor (3) driven by an electric motor.

Step 1) Determining the Pressures and Temperatures within the Intake Circuit

In order to control the supercharging and notably the opening of the bypass valve, the method according to the invention requires knowledge of physical parameters within the intake circuit. These are the pressure $P_{avcm}$ and temperature $T_{avcm}$ upstream of the mechanical compressor (3) and the boost pressure $P_{sural}$ and temperature $T_{sural}$ on the intake side of the engine (1).

These physical parameters can be measured by pressure and temperature sensors or can be determined by an estimator.

According to one embodiment illustrated in FIG. 3, four sensors are arranged within the intake circuit. A pressure $P_{avcm}$ and a temperature $T_{avcm}$ are measured by sensors located at the outlet of the first charge air cooler (6) and boost pressure $P_{sural}$ and temperature $T_{sural}$ are measured at the outlet of the second charge air cooler (5).

Alternatively, only a boost pressure $P_{sural}$ and boost temperature $T_{sural}$ at the outlet of the second charge air cooler (5) are measured and a pressure $P_{avcm}$ and a temperature $T_{avcm}$ are determined by an estimator. For example, in order to estimate the pressure $P_{avcm}$ an estimator is used based on a dynamic model in the volume upstream of the mechanical compressor that involves the law of conservation of flow rates. In order to determine the temperature $T_{avcm}$, a map of the charge air cooler (6) and the estimated pressure $P_{avcm}$ is utilized.

Step 2) Acquiring a Boost Pressure Setpoint

A boost pressure setpoint $P_{sural}^{sp}$ is acquired that allows the behavior (torque) demanded from the engine to be achieved. This setpoint is given by the stage above in the engine control. It is usually mapped as a function of the setpoint for MIP (mean indicated pressure which is the mean specific pressure over the surface of the piston during a double compression-expansion stroke) and of the engine speed.

Step 3) Building the Filling Model

A filling model regarding the filling of the supercharging boost volume is provided. The supercharging boost volume is delimited on the one hand by the intake valves of the engine and on the other hand by the mechanical compressor (3) and the bypass valve (4). The filling model links the boost pressure $P_{sural}$ to the opening Bypass of the bypass valve (4) from the pressure $P_{avcm}$ and of the temperature $T_{avcm}$ upstream of the mechanical compressor (3) and the boost temperature $T_{sural}$. The filling model interprets the filling of the supercharging boost volume and takes the physical phenomena involved in this filling into consideration.

According to one embodiment of the invention, the evolution in the pressure downstream of the mechanical compressor is governed by the dynamics of the filling of the volume situated upstream of the valves. These dynamics can be written in the form of a formula:

$$\dot{P}_{sural} = \frac{RT_{sural}}{V_{sural}}(D_{cm} - D_{bp} - D_{asp})$$

The aspirated flow rate $D_{asp}$ is given by the engine filling model which is a static model linking the flow rate aspirated by the cylinders with the parameters on the intake side. A static flow model is conventionally part of the engine control and may be of the type $D_{asp}$ is function $P_{sural}$, $T_{sural}$, Ne. This model is therefore a function of the boost pressure.

The flow rate passing through the bypass valve $D_{bp}$ can be by the relationship:

$$D_{bp} = A_{bp}(\text{Bypass}) \times f(P_{avcm}, P_{sural}, T_{avcm})$$

where $A_{bp}$ (Bypass) is the area of opening of the bypass valve and f is the flow rate per unit area given by the following Saint-Venant relationship (relationship of pressure drops at the bypass valve):

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1 - \left(\frac{P_{avem}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

The mechanical compressor flow rate $D_{cm}$ can be written as the product of the volumetric flow rate and the density of the gases upstream by the relationship:

$$D_{cm} = \phi\left(r_{cm} \times N_e, \frac{P_{apcm}}{P_{avcm}}\right)\rho_{cm}$$

where $$\phi\left(r_{cm} \times N_e, \frac{P_{apcm}}{P_{avcm}}\right)$$

is the mapped volumetric flow rate (given by the supplier of the mechanical compressor), and $\rho_{cm}$ is the density of the gases passing through the mechanical compressor as given by the relationship $P_{cm} = P_{acvm}/RT_{acvm}$. The pressure $P_{apcm}$ situated downstream of the mechanical compressor (3) and upstream of the charge air cooler (5) is linked to the boost pressure by the addition of a pressure-drop term $\delta P$ for the pressure drop in the charge air cooler (5) by the relationship:

$$P_{apcm} = P_{sural} + \delta P(r_{cm} \times N_e, \rho_{cm}),$$

This pressure drop term $\delta P$ is mapped as a function of the speed of the mechanical compressor (which is equal to $r_{cm} \times Ne$ when the mechanical compressor (3) is driven by the engine (1)) and of the density of the gases $\rho_{cm}$.

By substituting the expression of the three flow rates into the first relationship, the boost pressure dynamics can be expressed in the form of a formula of the type:

$$\dot{P}_{sural} = \frac{RT_{sural}}{V_{sural}}\left(\phi\left(r_{cm} \cdot N_e, \frac{P_{sural} + \delta P(r_{cm} \cdot N_e, \rho_{cm})}{P_{avcm}}\right)\rho_{cm} - A_{bp}(\text{Bypass}) \cdot f(P_{avcm}, P_{sural}, T_{avcm}) - D_{asp}\right)$$

where Bypass and $P_{sural}$ represent the control and the output of the system to be controlled. This relationship constitutes a filling model for the filling of the supercharging boost volume.

Step 4) Calculating the Bypass Valve Opening Setpoint

The opening setpoint $\text{Bypass}^{sp}$ for the bypass valve (4) is determined by the filling model determined in the previous step and of the boost pressure setpoint $P_{sural}^{sp}$.

According to the embodiment described in the previous step, in order to determine the opening setpoint $\text{Bypass}^{sp}$ of the bypass valve (4), the relationship obtained is inverted and applied to the boost pressure setpoint $P_{sural}^{sp}$, providing a formula:

$$\text{Bypass}^{sp} = A_{bp}^{-1}\left(\frac{1}{f(P_{avcm}, P_{sural}, T_{avcm})}\right.$$

$$\left.\left(-\frac{V_{sural}}{RT_{sural}}\dot{P}_{sural}^{sp} + \phi\left(r_{cm} \cdot N_e, \frac{P_{sural} + \delta P(r_{cm} \cdot N_e, \rho_{cm})}{P_{avcm}}\right)\rho_{cm} - D_{asp}\right)\right)$$

This control law is therefore slightly modified. The boost pressure $P_{sural}$ and the aspirated flow rate $D_{asp}$ are replaced by their setpoints. The aspirated flow rate setpoint may be given directly by the stage above in the engine control or may be determined by the filling model for the filling of the engine in which model the boost pressure setpoint is considered. For example, the model may be written $D_{asp}^{sp}$ is a function of ($P_{sural}^{sp}$, $T_{sural}$, Ne). This increases the robustness of the control law. In open loop, the calculation for the opening setpoint $\text{Bypass}^{sp}$ of the bypass valve can be written in the form of a relationship:

$$\text{Bypass}^{sp} = A_{bp}^{-1}\left(\frac{1}{f(P_{avcm}, P_{sural}^{sp}, T_{avcm})}\right.$$

$$\left(-\frac{V_{sural}}{RT_{sural}}\dot{P}_{sural}^{sp}+\phi\left(r_{cm}\cdot N_e,\frac{P_{sural}^{sp}+\delta P(r_{cm}\cdot N_e,\rho_{cm})}{P_{avcm}}\right)\left(\rho_{cm}-D_{asp}^{sp}\right)\right)$$

The dynamic term $P_{sural}^{sp}$ here allows a transient acceleration function to be performed.

Step 5) Controlling the Bypass Valve

Once the opening setpoint Bypass$^{sp}$ of the bypass valve (4) has been determined, the setpoint is applied to the bypass valve (4) to achieve the expected boost pressure setpoint $P_{sural}^{sp}$. In this way, the desired engine load is obtained.

Step 6) Activating the Mechanical Compressor

When the mechanical compressor (3) is driven by the combustion engine (1), a clutch (11) is inserted between a reduction gear and the compressor (3). Control of this clutch (11) provides activation and deactivation of the compressor (3): specifically, this is generally an "on/off" command. The clutch (11) is closed in the zone of use of the mechanical compressor (zones Z2 and Z3 in FIG. 2) and otherwise open (zones Z1 and Z4 in FIG. 2). Advantageously, control of the clutch (11) is directly linked to control of the bypass valve, that is to the opening setpoint Bypass$^{sp}$ of the bypass valve (4). For preference, when the opening of the valve (4) is incomplete (the valve is open by less than 99% of its full openness), and when the engine speed Ne is below a predetermined threshold S (S is notably chosen to be equal to 3000 rpm), the mechanical compressor (3) is engaged. If not, it is disengaged.

When the mechanical compressor (3) is driven by an electric motor, control of the electric motor provides activation and deactivation of the compressor (3) to comply with the zones of operation illustrated in FIG. 2.

The method according to the invention is suited to the control of combustion engines, notably for vehicles and more particularly automobiles. The combustion engine concerned may be a gasoline engine or a diesel engine.

Alternative Forms of Embodiment

According to an alternative form of embodiment of the invention, a control loop is used to determine the opening setpoint Bypass$^{sp}$ of the bypass valve, and this is then referred to as closed-loop control. That makes it possible to reduce the static error between the measured boost pressure and its setpoint.

In order to achieve this objective, the goal is to force the plot of boost pressure $P^{sural}$ to follow the plot of its setpoint $P_{sural}^{sp}$, with a relationship:

$$\dot{P}_{sural}-\dot{P}_{sural}^{sp}=-K_p(P_{sural}-P_{sural}^{sp})-K_i\int_0^t(P_{sural}-P_{sural}^{sp})dt$$

being imposed. The gains $K_p$ and $K_i$ are calibration parameters. Given the structure of the controller, these gains are constant, valid throughout the operating range, which allow the non-linearity of the system to be taken into consideration.

This correction reveals a proportional term and an integral term of the error. The dynamics are inverted thereafter exactly as in step 4) of calculating the opening setpoint Bypass$^{sp}$ for the bypass valve. Closed loop control relationship is used:

$$Bypass^{sp}=A_{bp}^{-1}\left(\frac{1}{f(P_{avcm},P_{sural}^{sp},T_{avcm})}\left(-\frac{V_{sural}}{RT_{sural}}\dot{P}_{sural}^{sp}+\right.\right.$$

$$\left.\left.\delta_{PI}+\phi\left(r_{cm}\cdot N_e,\frac{P_{sural}^{sp}+\delta P(r_{cm}\cdot N_e,\rho_{cm})}{P_{avcm}}\right)\left(\rho_{cm}-D_{asp}^{sp}\right)\right)\right)$$

is thus obtained, where $$\delta_{PI}=-K_p(P_{sural}-P_{sural}^{sp})-K_i\int_0^t(P_{sural}-P_{sural}^{sp})dt$$

Advantageously, the looping (or "feedback") term is extracted from the multiplicative factor $RT_{sural}/V_{sural}$. Because this ratio is nearly constant, it is included in the values of the calibration parameters $K_p$ and $K_i$.

According to a second alternative form of embodiment of the invention, the variable geometry turbocharger VGT (2) can be controlled using a setpoint determined with a map of the turbocharger (2).

Application Examples

In order to verify the behavior of the combustion engine with the method according to the invention, simulations are carried out for open-loop control and closed-loop control for the combustion engine instrumented according to FIG. 3. For these simulations, the predetermined threshold S for the use of the mechanical compressor is set at 3000 rpm. FIGS. 4 to 11 correspond to open-loop control as described in step 4) and FIGS. 12 to 14 correspond to closed-loop control as described in the paragraph entitled alternative forms of embodiment.

Figure 4A:
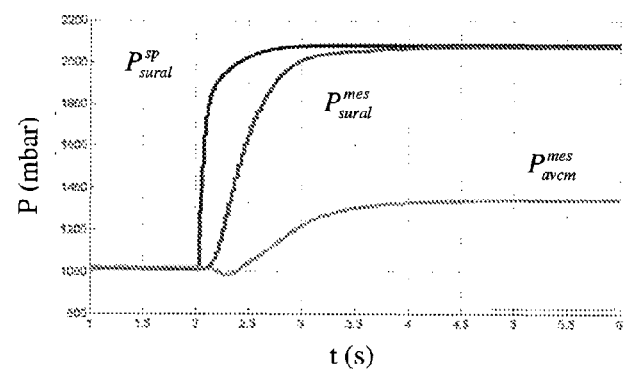
FIG. 4a) to 4c) illustrate the boost pressure, the opening of the bypass valve and the opening of the VGT turbine for open-loop control according to one embodiment of the method according to the invention for an engine speed of 1000 rpm.
Figure 4B:
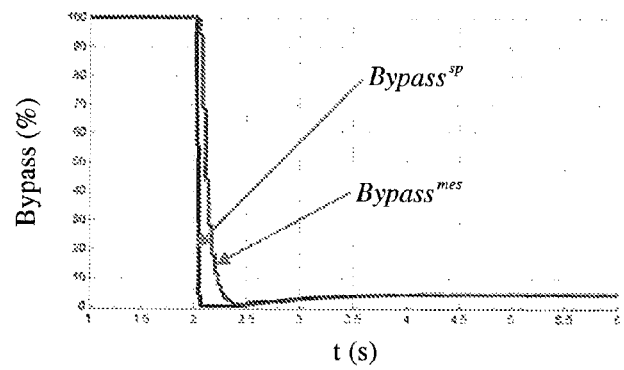
Figure 4C:
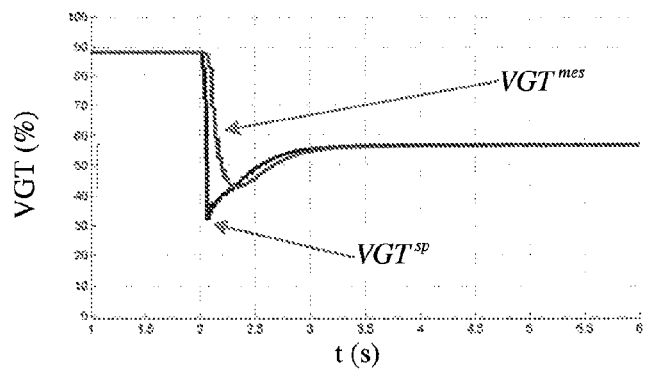

FIG. 4a) to 4c) depict an increase in load for an engine speed of 1000 rpm (zone Z2 in FIG. 2). FIG. 4a) shows the setpoint boost pressure $P_{sural}^{sp}$ and measured boost pressure $P_{sural}^{smes}$ as well as the measured pressure upstream of the mechanical compressor $P_{avcm}^{mes}$. The two FIGS. 4b) and 4c) show the openings of the air actuators, of the bypass valve and of the VGT (setpoint and measured openings). In all the figures, the openings are expressed in percent, 0% signifies that the actuator is closed, whereas 100% signifies that the actuator is wide open. The torque demand occurs at 2 seconds. The boost pressure demanded is then around 2100 mbar.

The opening of the VGT turbocharger (2) is positioned by a map plus a proportional term on the boost pressure error and the VGT closes at the start of the transient phase. The bypass valve (4) closes to a great extent and then reopens to return to a constant opening position in the steady state. The significant closure of the bypass valve has the effect of speeding up the boost pressure response by compensating for the turbo lag.

Figure 5A:
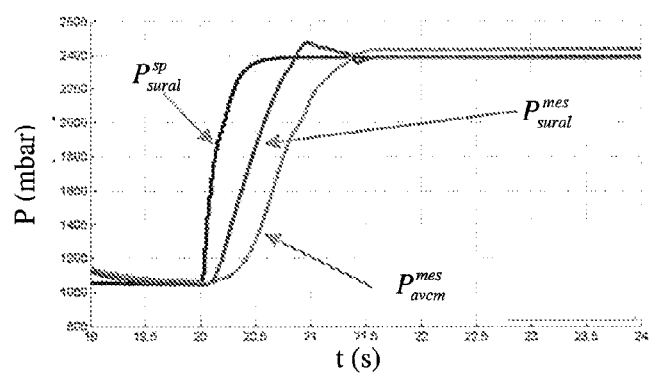
FIG. 5a) to 5c) illustrate the boost pressure, the opening of the bypass valve and the opening of the VGT turbine for open-loop control according to one embodiment of the method according to the invention for an engine speed of 2500 rpm.
Figure 5B:
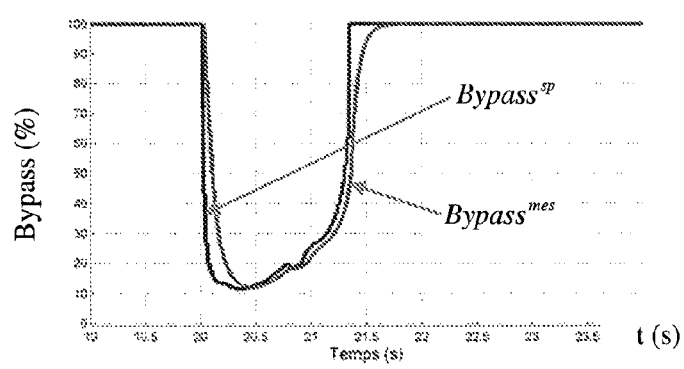
Figure 5C:
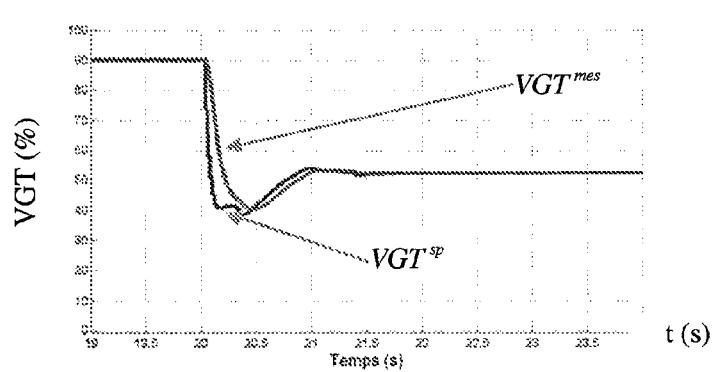

FIG. 5a) to 5c) correspond to FIG. 4a) to 4c) for a speed of 2500 rpm (zone Z3 in FIG. 2). In this test, the mechanical compressor (3) is not needed to achieve the required load. However, the open-loop control according to the invention uses the compressor during a transient phase to accelerate the boost pressure response. FIG. 5b) clearly shows that the bypass valve is initially open (at light load), then closes during the transient phase, and finally reopens when the desired boost pressure is achieved. This test shows the system acceleration obtained using the mechanical compressor (3) transiently.

Figure 6A:
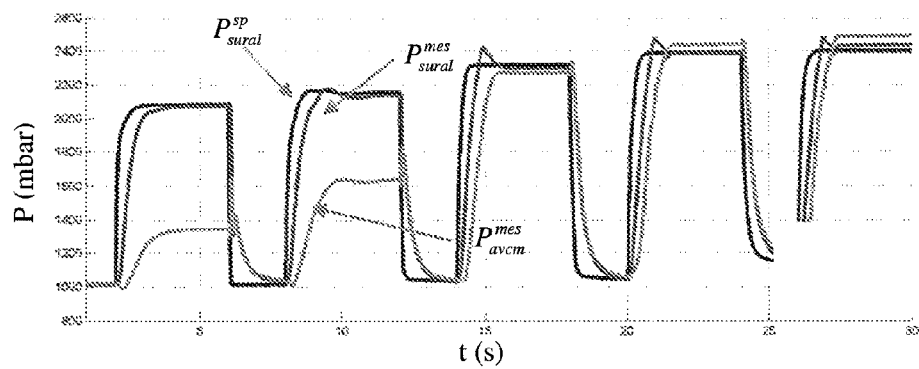
FIG. 6a) to 6c) illustrate the boost pressure, the opening of the bypass valve and the opening of the VGT turbine for open-loop control according to one embodiment of the method according to the invention for various engine speeds: 1000, 1500, 2000, 2500 and 3000 rpm.

FIG. 6a) to 6c) show increases in torque for various speeds: 1000, 1500, 2000, 2500 and 3000 rpm. The figures respectively depict the boost pressure $P_{sural}$ (and the pressure upstream of the mechanical compressor), the position of the bypass valve $_{Bypass}$ and the position of the VGT.

The first three increases in load (at 1000, 1500 and 2000 rpm) fall within the zone of use of the mechanical compressor (zone Z2 in FIG. 2). It may be clearly seen that at the end of the transient, the VGT is positioned in such a way that the efficiency of the turbomachine (2) is optimum and the bypass valve (4) is still closed. Nonetheless it may be seen that, during the transient, the bypass valve (4) closes further in order to speed up the system.

The next two increases in load (at 2500 and 3000 rpm) fall within the zone in which, in the steady state, it is preferable not to engage the mechanical compressor (zone Z3 of FIG. 2). However, the command to control the boost pressure seeks to engage the mechanical compressor (3) transiently in order to speed up the boost pressure response. At the end of the transient, the mechanical compressor (3) is disengaged again.

The robustness of the control method with respect to atmospheric conditions (variations in atmospheric pressure and in atmospheric temperature) and with respect to the quantity of fuel injected are then verified.

Figure 7A:
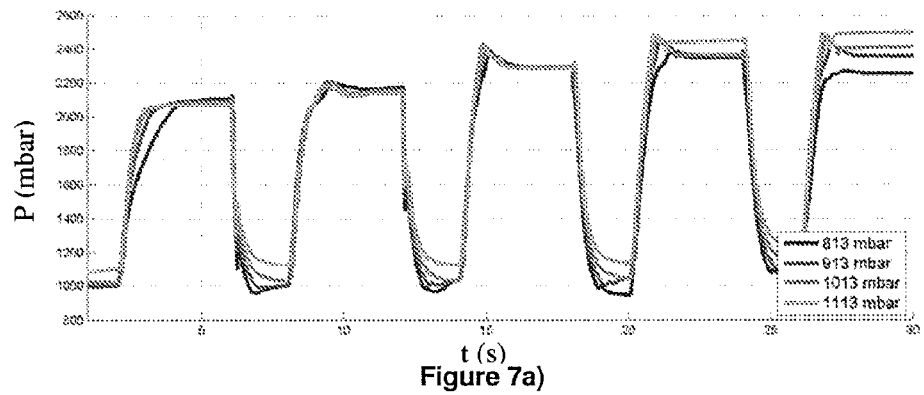
FIG. 7a) to 7d) illustrate the boost pressure, the opening of the bypass valve, the opening of the VGT turbine and the mean effective pressure (MEP) for open-loop control according to one embodiment of the method according to the invention for various engine speeds: 1000, 1500, 2000, 2500 and 3000 rpm with variations in atmospheric pressure.

FIG. 7a) to 7d) and 8a) to 8d) show loading transients for various speeds: 1000, 1500, 2000, 2500 and 3000 rpm. A number of scenarios are therefore compared: 813, 913, 1013 and 1113 mbar for variations in atmospheric pressure (FIG. 7) and 0, 10, 20, 30 and 40° C. for variations in atmospheric temperature (FIG. 8).

FIGS. 7a) and 8a) depict the boost pressure. It may be seen that pressure tracking in the various cases is good. At 1000 rpm, the transient is slower for the low pressures because of the saturation of the bypass actuator (4).

Figure 7B:
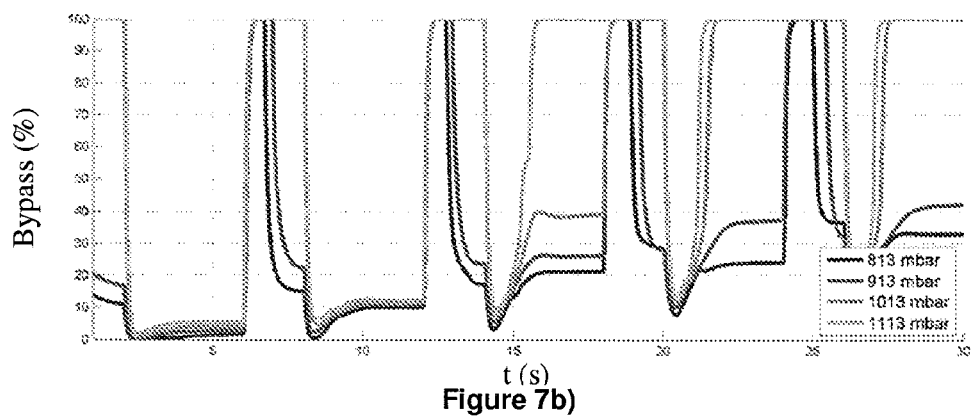
Figure 7C:
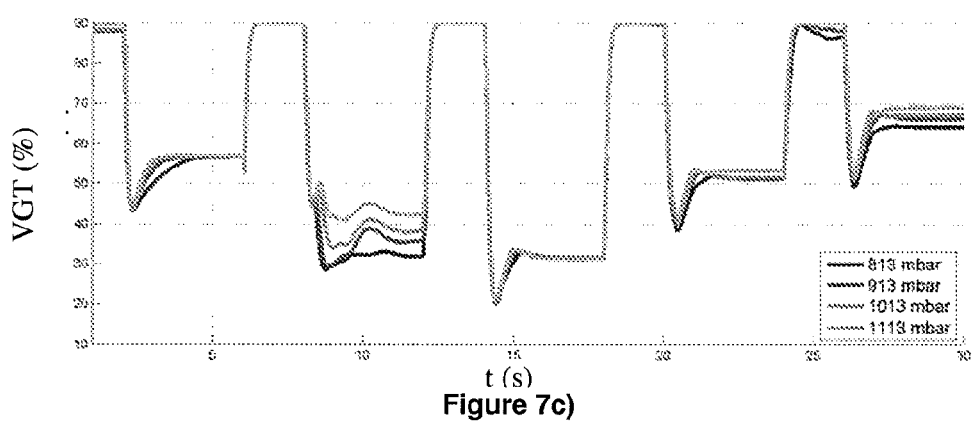

FIGS. 7b), 7c) and 8b), 8c) show the position of the actuators. It may be clearly seen here that the open-loop strategy modifies the position of the bypass valve (4) to satisfy the boost pressure. In this way, the strategy addresses the need to use corrective maps as a function of atmospheric conditions.

Figure 7D:
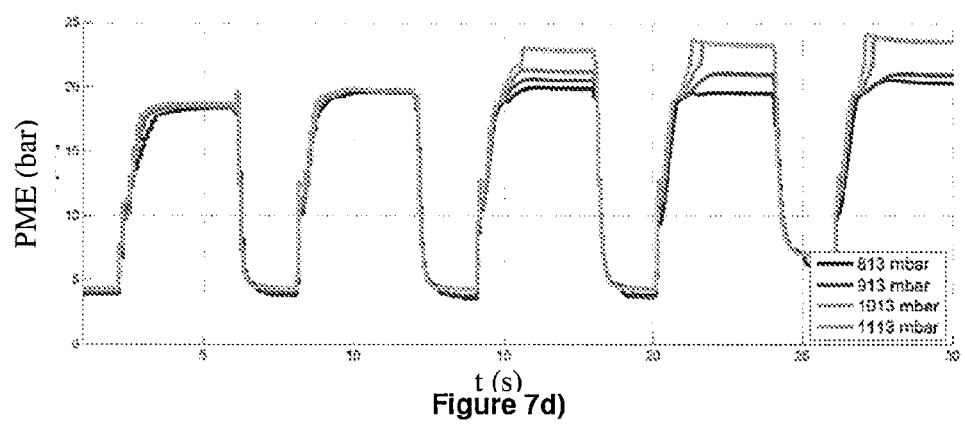
Figure 8A:
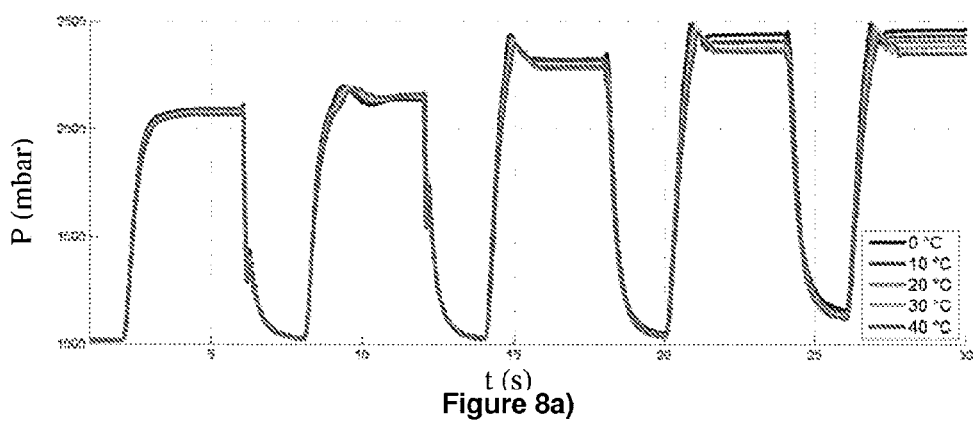
FIG. 8a) to 8d) illustrate the boost pressure, the opening of the bypass valve, the opening of the VGT turbine and the mean effective pressure (MEP) for open-loop control according to one embodiment of the method according to the invention for various engine speeds: 1000, 1500, 2000, 2500 and 3000 rpm with variations in atmospheric temperature.
Figure 8B:
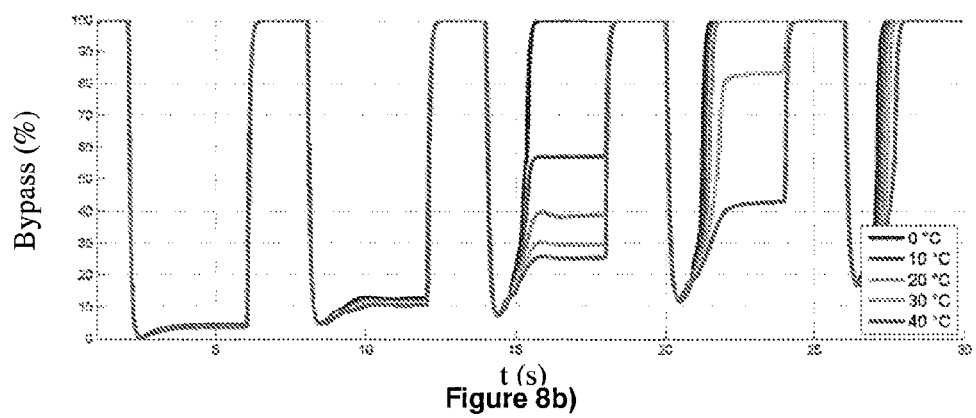
Figure 8C:
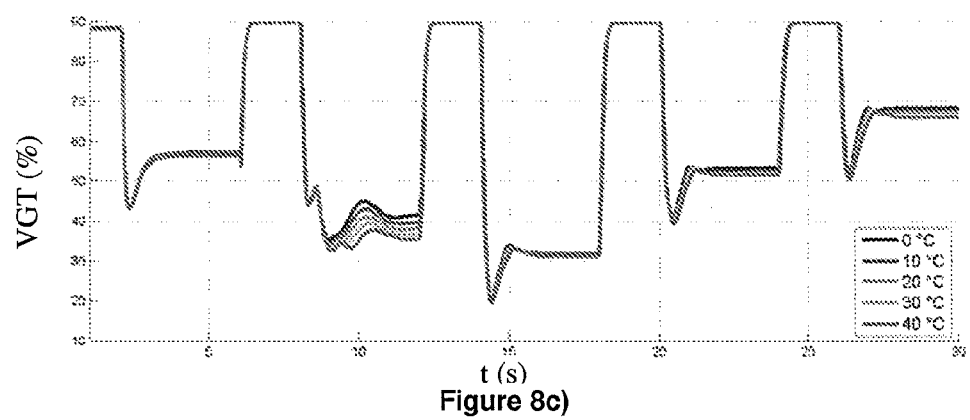
Figure 8D:
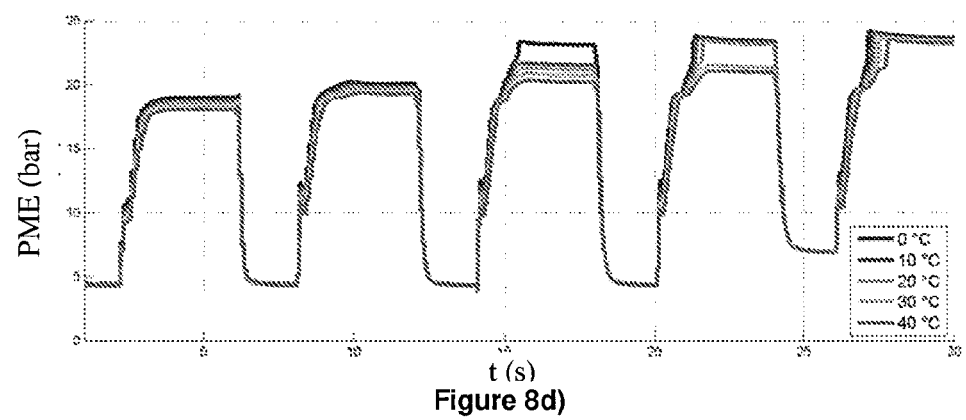

FIGS. 7d) and 8d) give the mean effective pressure (MEP). It is seen here that the open-loop strategy makes possible maintaining the same responsiveness when the atmospheric conditions change. The term responsiveness is a technical term in the automotive field which qualifies the driving performance/feel of a vehicle during the full load phase. For example, a supercharged engine will suffer with responsiveness less than a naturally aspirated engine for the same power.

Figure 9A:
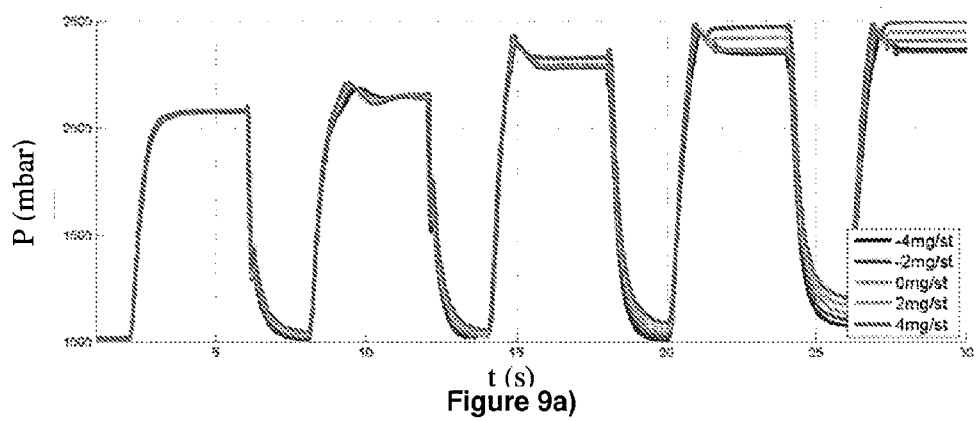
FIG. 9a) to 9d) illustrate the boost pressure, the opening of the bypass valve, the opening of the VGT turbine and the mean effective pressure (MEP) for open-loop control according to one embodiment of the method according to the invention for various engine speeds: 1000, 1500, 2000, 2500 and 3000 rpm with variations in quantity of fuel injected.

The influence that the variation in the quantity of fuel injected has on the control of the double supercharging is studied. FIG. 9a) to 9d) show loading transients for various speeds: 1000, 1500, 2000, 2500 and 3000 rpm. Various scenarios are therefore compared: −4, −2, 0, 2 and 4 mg of fuel with respect to nominal injection. The units mg/st stand for mg/stroke, namely the quantity in each cylinder for each engine stroke, i.e. every 90° of rotation of the crankshaft for a 4-stroke, 4-cylinder engine.

FIG. 9a) shows the boost pressure $P_{sural}$. It is to be noted that the pressure response is the same for the various scenarios.

Figure 9B:
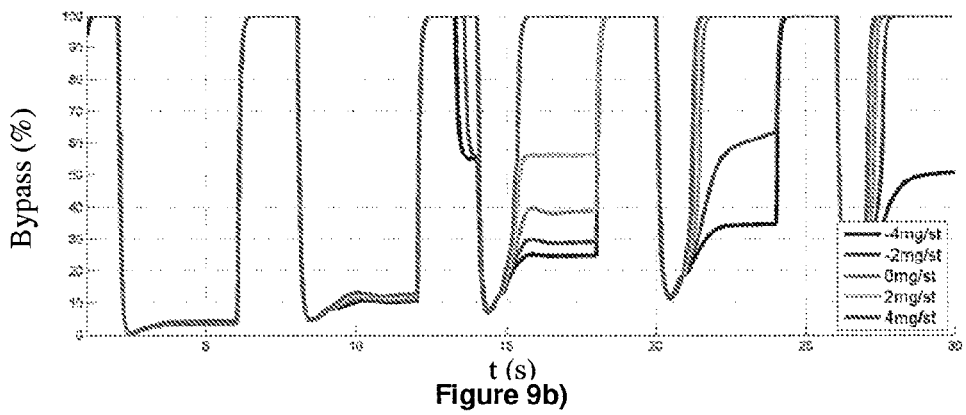
Figure 9C:
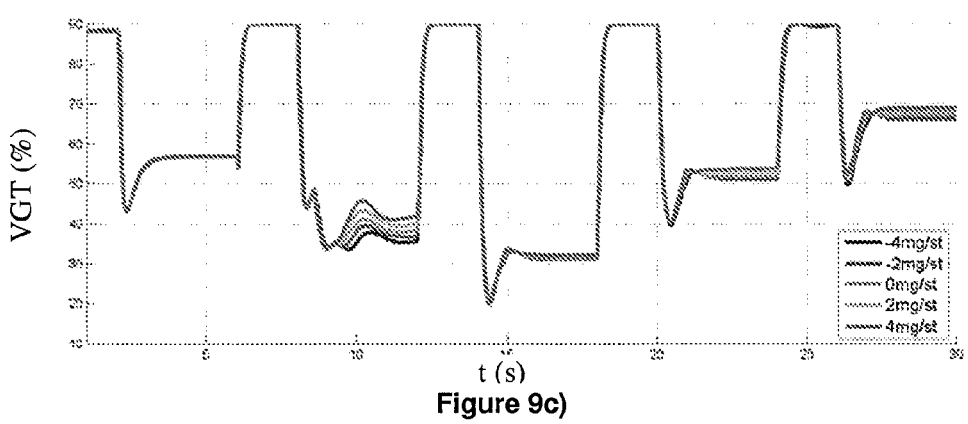

FIGS. 9b) and 9c) show the position of the actuators. It can be clearly seen here again that the open-loop control modifies the position of the bypass valve (4) in such a way as to satisfy the boost pressure. Specifically, the variation in injection conditions has a high impact on the exhaust pressure and therefore on the operation of the turbocharger (2). The control of the double supercharging automatically compensates for this loss of performance of the turbocharger (2) by closing the bypass valve to a greater or lesser extent.

Figure 9D:
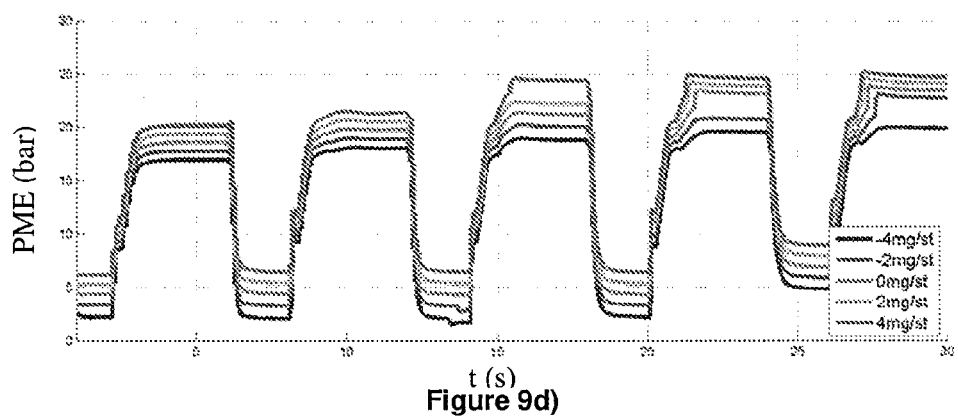

FIG. 9d) gives the mean effective pressure (MEP). Here, the impact that the variations in the quantity of fuel injected have on the production of torque can be clearly seen.

In the light of FIGS. 7 to 9, it is confirmed that the control method is robust with respect to atmospheric conditions and with respect to injection conditions.

The robustness of the control method with respect to spread on the various sensors and systems is then verified. The spread is intended to simulate a difference between vehicles as they leave the factory. A sample size of 1000 vehicles is considered. The spread follows a Gaussian distribution.

The spread on the sensors is as follows:

boost pressure sensor: three sigma at 35 mbar (which means that the probability of the actual pressure value being less than 35 mbar away from the measured value is 99.7%), pressure sensor sensing pressure upstream of mechanical compressor: three sigma at 35 mbar (it should be noted that two pressure sensors may be readjusted to one another, and the spread applied thereafter is therefore identical for both these sensors), boost temperature sensor: three sigma at 3° C., temperature sensor sensing temperature upstream of mechanical compressor (3): three sigma at 3° C.

The spread on the components of the supercharging system is as follows:

The flow rate through the mechanical compressor (3) is three sigma at 0.5%.

The effectiveness of the centrifugal compressor (2) is three sigma at 2%.

The effectiveness of the turbine (2) is three sigma at 2%.

The position of the VGT (2) is three sigma at 4%.

The position of the bypass valve (3) is three sigma dependent on the openness. Compare with table 1 below:

TABLE 1

Spread on bypass valve

| | Openness of bypass valve (%) | | | | | |
|---|---|---|---|---|---|---|
| | 100 | 80 | 60 | 40 | 20 | 0 |
| Three sigma (%) | 1.46 | 2.91 | 4.01 | 5.48 | 7.80 | 6.63 |

Figure 10A:
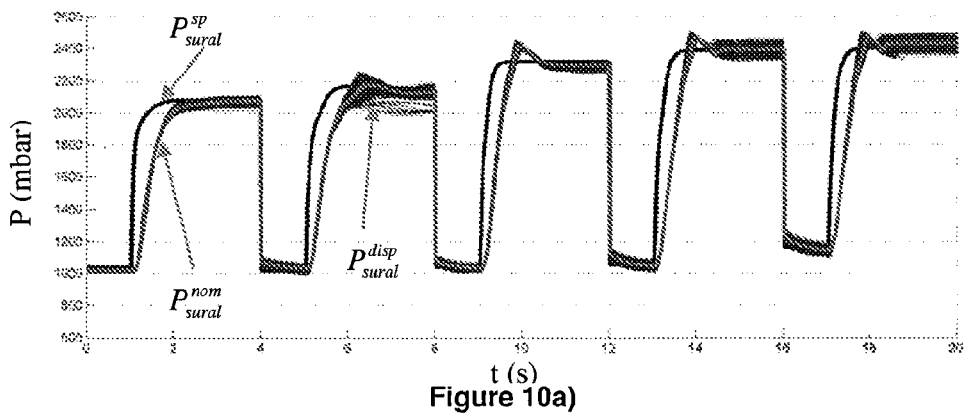
FIG. 10a) to 10c) illustrate the boost pressure, the opening of the bypass valve and of the VGT turbine (in the same figure) and the mean effective pressure (MEP) for open-loop control according to one embodiment of the method according to the invention for various engine speeds: 1000, 1500, 2000, 2500 and 3000 rpm taking into account spread on the sensors and components of the supercharging system.

FIG. 10a) to 10c) show the same load transients at various speeds as FIG. 6a) to 6c). The thousand samples representing the thousand vehicles leaving the factory are simulated. The spread on the sensors and components of the supercharging system are shown at the same time. The three figures show the boost pressure (FIG. 10a), the position of the actuators (VGT and bypass valve) (FIG. 10b) and the MEP (at engine output, i.e. taking account of the mean friction pressure MFP induced by the use of the mechanical compressor) (FIG. 10c). In each figure, the curves in bold line depict the nominal operating scenario, with no spread (equivalent to the results of FIG. 6), and the curves in fine line represent the thousand dispersed cases with spread.

It will be noted first of all that the boost pressure transient is not very affected by the presence of the spread. The static error obtained is likewise also limited to around 100 mbar.

Figure 10B:
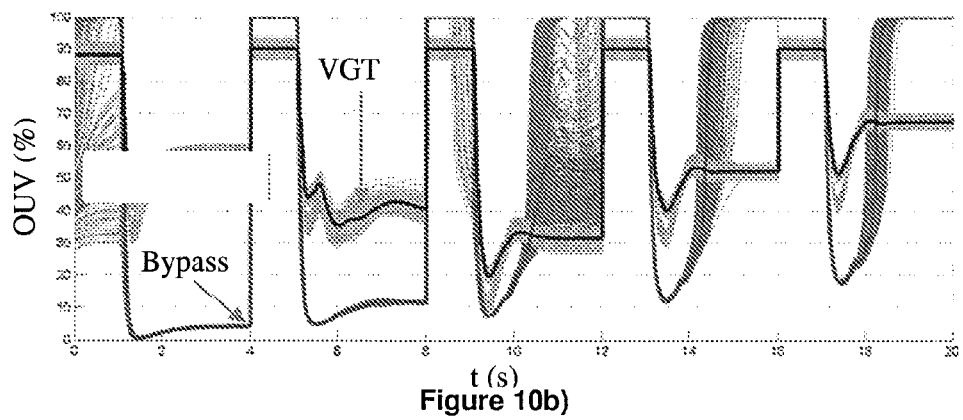
Figure 10C:
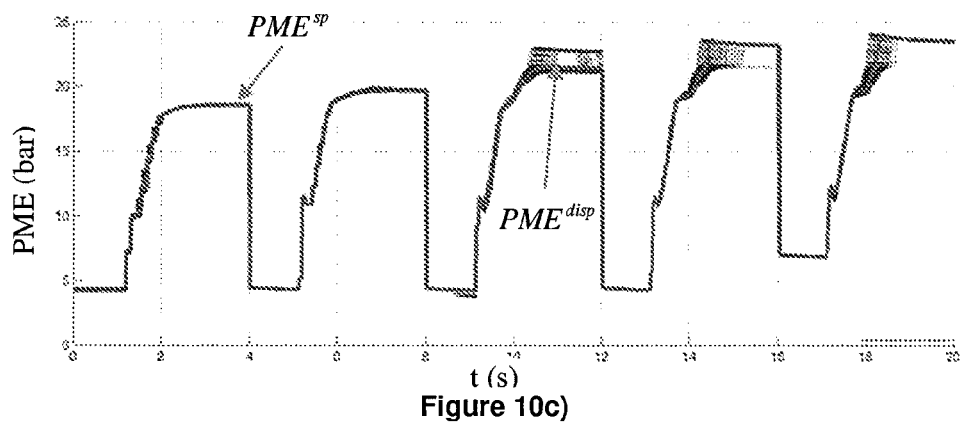

FIG. 10b) shows that the plot of the position of the actuators changing greatly with spread, notably at higher speeds. This can be explained by the fact that, at high speed, the pressure difference across the bypass valve (4) is smaller. An error in the measurement of the pressures upstream and downstream of this valve will therefore introduce a large modification into the prepositioning of the bypass valve (4). However, it is important to note that this modification to the position of the actuators has no impact on the output of the system which is the boost pressure.

FIG. 10c) shows the MEP response which appears to be only relatively slightly affected by the spread applied, of the order of 1 bar (according to whether or not the mechanical compressor is disengaged at the end of the transient).

Figure 11A:
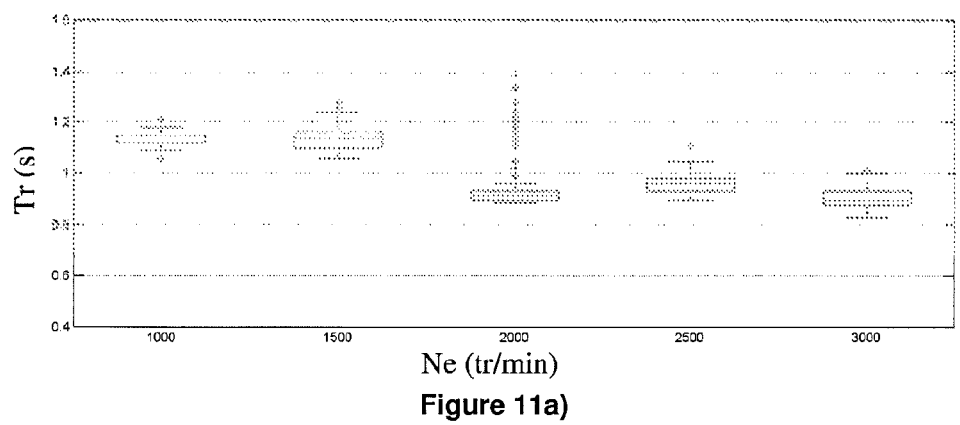
FIGS. 11a) and 11b) depict the absolute value of the static error in boost pressure over 1000 dispersed tests for open-loop control according to one embodiment of the invention.

FIGS. 11a) and 11b) show the response time Tr at 95% and the value of the boost pressure overshoot D corresponding to the results of FIG. 10. For each speed, the horizontal lines of the rectangle define the second quartile, the median and the third quartile. The lines outside the rectangle represent the interval at three sigma (99.7% of the points are within the interval). The points defined by crosses are marginal points. It should be noted that the response time Tr is almost independent of engine speed Ne because of the compensation for the lag of the turbocharger (2) provided by the mechanical compressor (3). Moreover, the static error is relatively small as the value of the overshoot D confirms. That means that the open-loop control is robust with regard to spread. Nevertheless, a static error is still present in the presence of spread. Closed-loop control may allow the latter to be canceled completely.

Figure 12A:
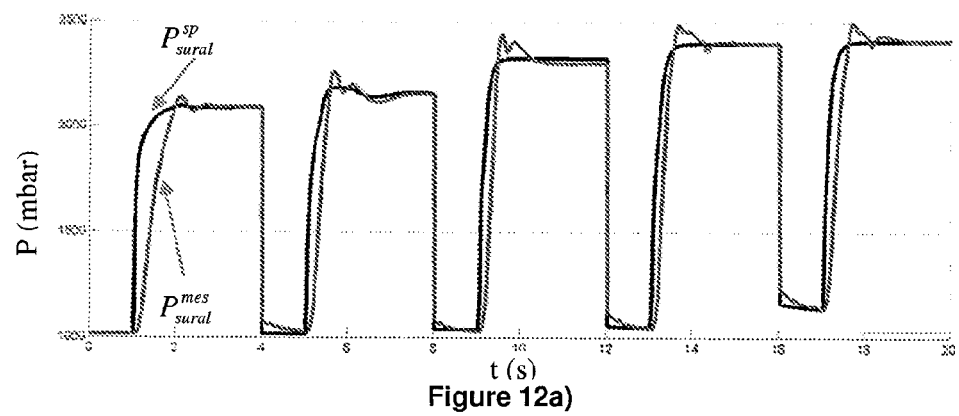
FIG. 12a) to 12c) correspond to FIG. 6a) to 6c) for closed-loop control according to a second embodiment of the method according to the invention.
Figure 12B:
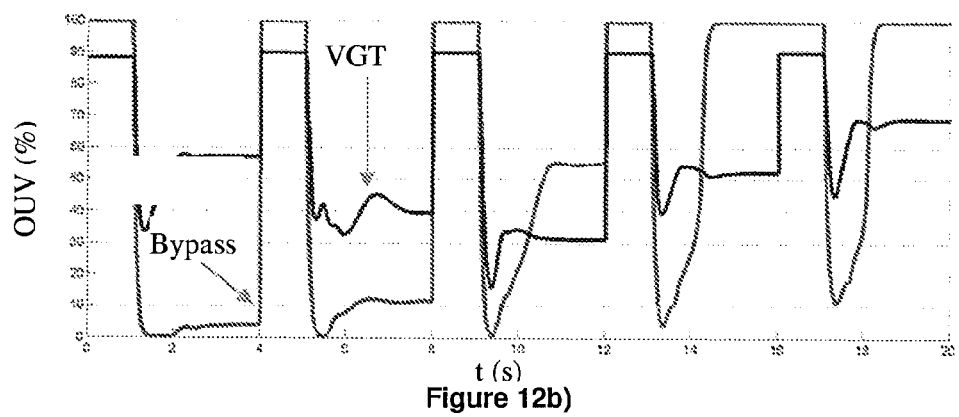
Figure 12C:
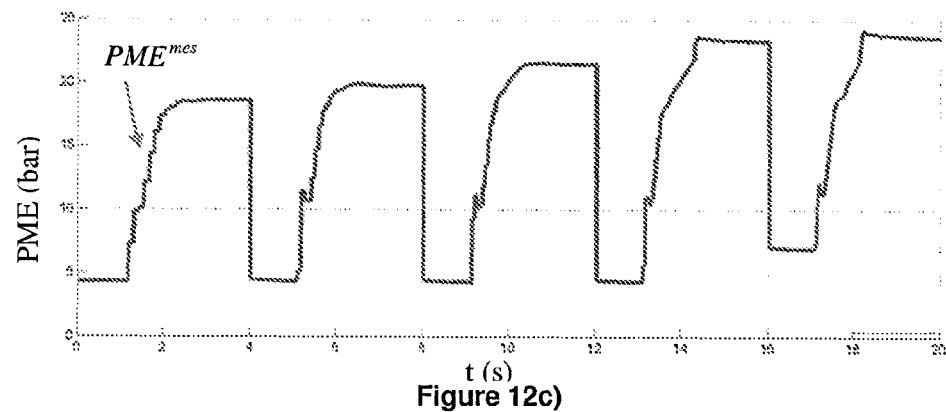

FIG. 12a) to 12c) show applications of torque for various speeds: 1000, 1500, 2000, 2500 and 3000 rpm for closed-loop control. The figures respectively depict the boost pressure (FIG. 12a), the position of the actuators (VGT and Bypass) (FIG. 12b) and MEP (at engine output, that is taking the use of the mechanical compressor into consideration) (FIG. 12c).

Figure 6B:
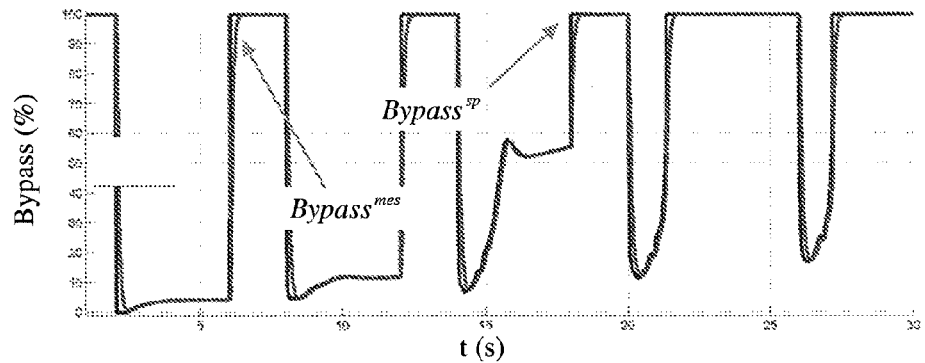
Figure 6C:
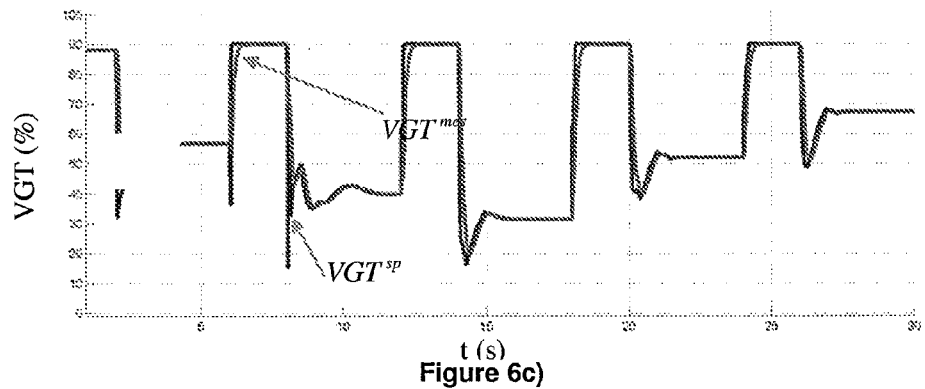

These results are to be compared with those of FIG. 6, giving the results of the open-loop control. It is clear here that in the absence of spread on the system, the open-loop strategy already followed the plot well. The work of the "feedback" terms in the control is therefore limited here. This makes calibrating the controller far easier as the latter is working only close to the setpoint plot.

Figure 11B:
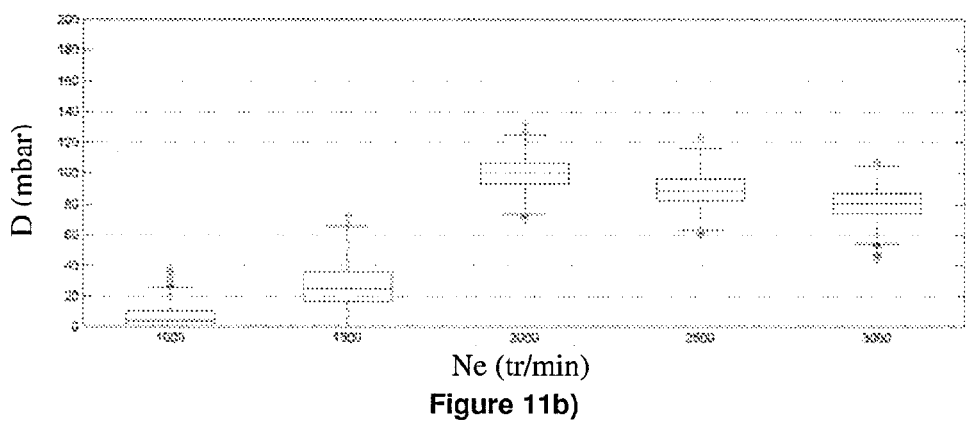
Figure 13A:
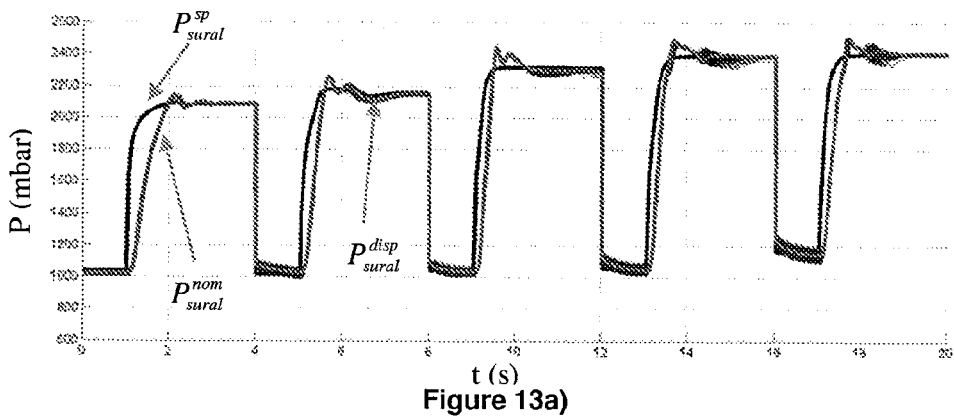
FIG. 13a) to 13c) correspond to FIG. 10a) to 10c) for closed-loop control according to a second embodiment of the method according to the invention.
Figure 13B:
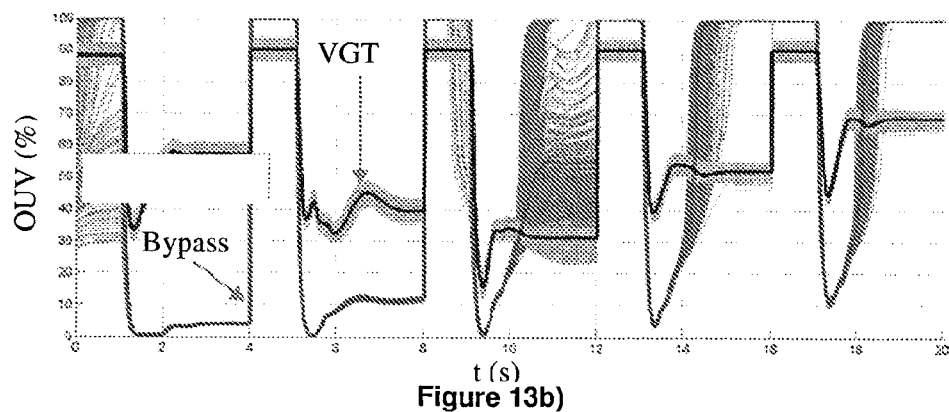
Figure 13C:
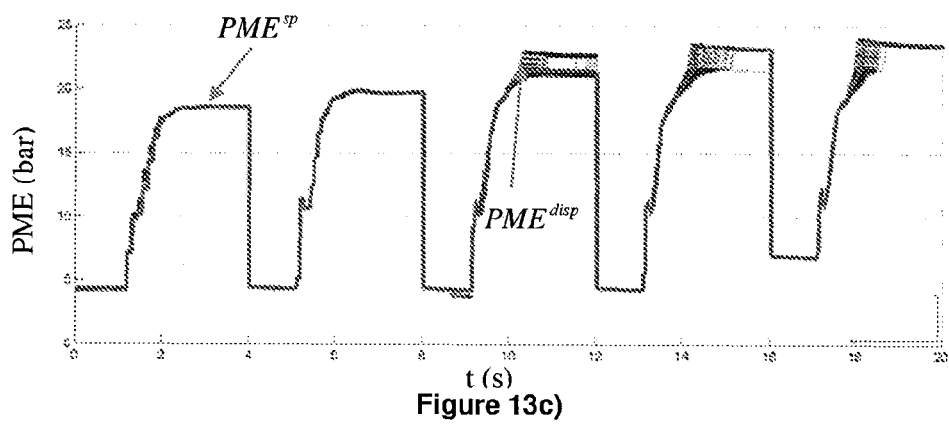

The same spread as for the simulations of FIGS. 10 and 11 is then applied. FIG. 13a) to 13c) show the same load transients at various speeds as in FIG. 12. The thousand samples representing the thousand vehicles leaving the factory are simulated here. The spread on the sensors and components of the supercharging system are shown at the same time. FIG. 13 show the boost pressure (FIG. 13a), the position of the actuators (VGT and bypass valve) (FIG. 13b) and the MEP (at engine output, that is taking the use of the mechanical compressor into consideration) (FIG. 13c). In each figure, curves in bold lines represent the nominal operating scenario, with no spread (equivalent to the results of FIG. 12) and the curves in fine line represent the thousand dispersed cases with spread.

These results are to be compared with those of FIG. 10 (the open-loop results). It should be noted first of all that the static error on the boost pressure has disappeared. The second observation is that the positions of the supercharging actuators exhibit far less spread. Finally, the MEP also has less spread. The remaining error comes from the spread on the boost pressure sensor.

Figure 14A:
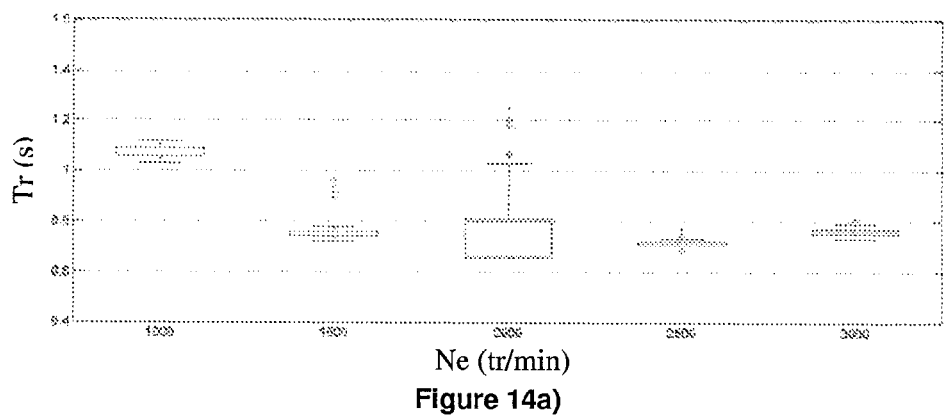
FIGS. 14a) and 14b) correspond to FIGS. 11a) and 11b) for closed-loop control according to a second embodiment of the method according to the invention.

FIGS. 14a) and 14b) give the response time Tr at 95% and the boost pressure overshoot D on the thousand dispersed tests with spread. For each engine speed, the horizontal lines of the rectangle define the second quartile, the median and the third quartile. The lines outside the rectangle represent the interval at three sigma (99.7% of the points are within the interval). The points defined by crosses are marginal points.

It should be noted that the response time Tr varies very little from one speed to another, between 700 ms and 1100 ms. Here the full benefit of the use of the mechanical compressor (3) in the transient phase can be seen. The robustness of the control is also evidenced by the small variance in response time Tr in the system subjected to spread.

Figure 14B:
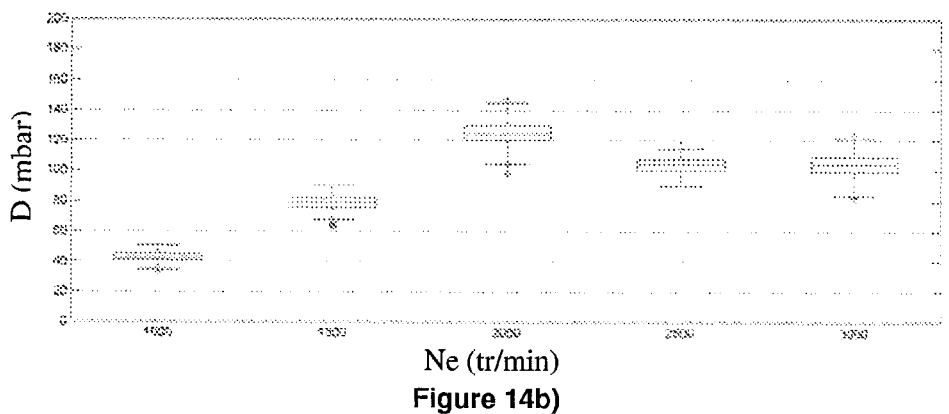

FIG. 14b) shows the boost pressure overshoot D. Here it is seen that the boost pressure overshoot is constant over the entire range of speeds and that its maximum value does not exceed 150 mbar.

In the light of these results, the control method according to the invention, whether in open loop or in closed loop, is indeed robust with regard to a spread originating from the sensors and/or components of the supercharging system.

A validation on transients of a vehicle is carried out in order to verify the performance of the method for controlling the double supercharging. To do that, a model of a vehicle (of the family car type) was developed.

The results which follow give the results of foot-hard-down simulations for various gear ratios and various starting speeds. Open throttle is the name given to a strong demand for torque corresponding to the accelerator pedal being fully depressed. These simulations are carried out using the closed-loop control.

Figure 15A:
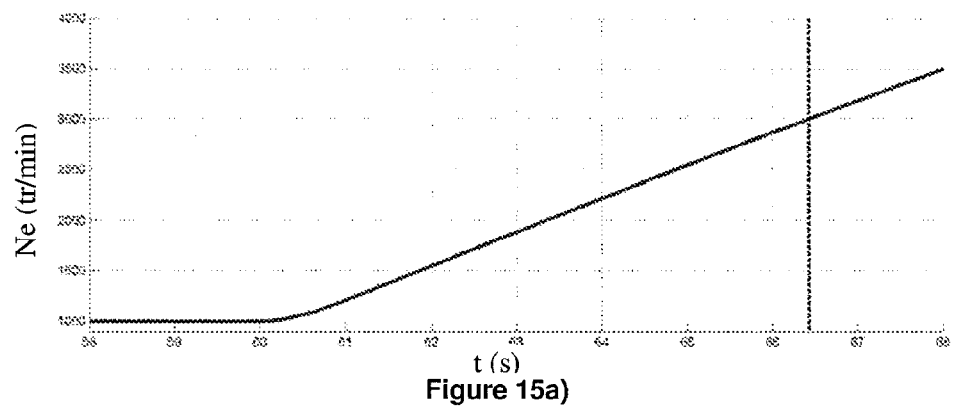
FIG. 15a) to 15c) respectively illustrate the engine speed, the boost pressure and the positions of the actuators for a full load from 1000 rpm.

FIG. 15a) to 15c) show an open throttle for BV3 ($3^{rd}$ gear) at 1000 rpm. In each of the three figures, the vertical dotted line indicates the moment at which the engine speed exceeds 3000 rpm, that is the speed beyond which the mechanical compressor (3) has to be disengaged.

FIG. 15a) shows the change in engine speed Ne.

Figure 15B:
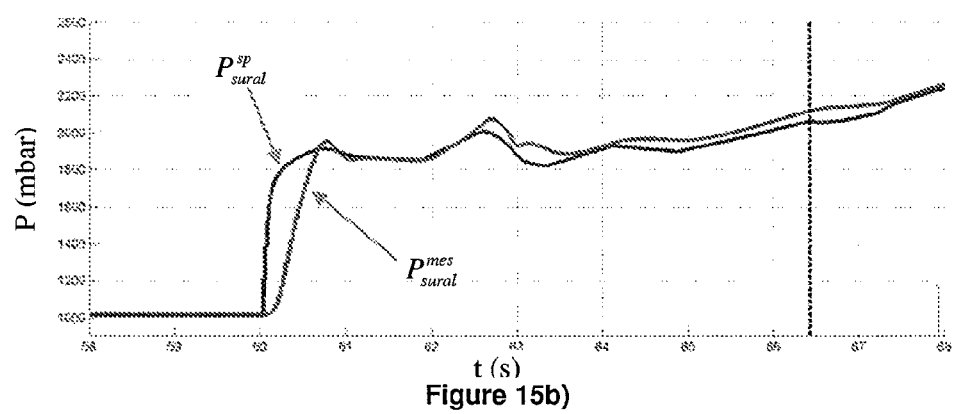

FIG. 15b) shows the setpoint boost pressure and the measured boost pressure. It is seen here that the pressure transient is rapid and occurs a fair distance away from the zone demarcating the limit of use of the mechanical compressor (3).

Figure 15C:
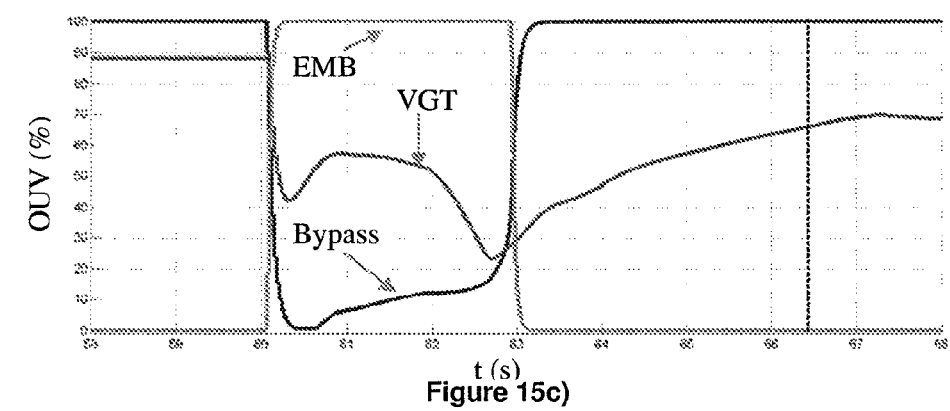

FIG. 15c) gives the position of the actuators which are the bypass valve (4), the VGT (2) and the clutch (11) of the mechanical compressor. It may be seen that at the start of the transient, the compressor (3) is engaged, the bypass valve (4) closes to obtain the required boost pressure and the VGT (2) closes. After a certain time, the bypass valve (4) reopens and the mechanical compressor (3) is disengaged which becomes superfluous because the turbocharger (2) is capable on its own of achieving the boost pressure demanded.

Figure 16A:
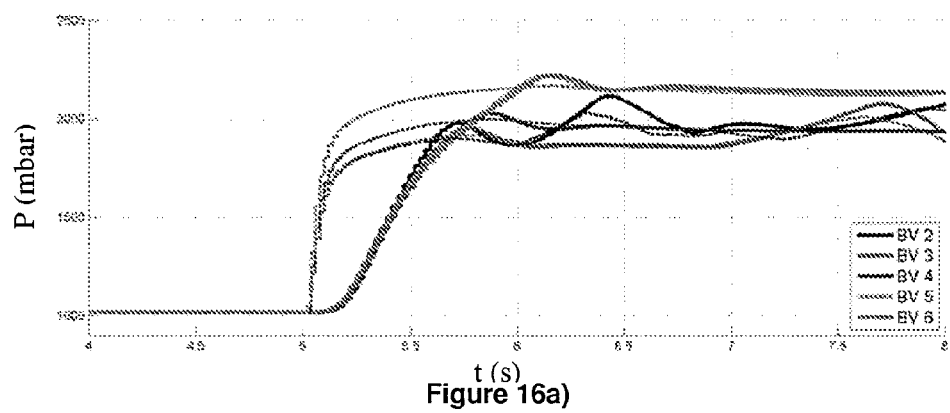
FIGS. 16a) and 16b) illustrate the boost pressure and the acceleration of the vehicle at full load from 1000 rpm for various gearbox ratios.

FIGS. 16a) and 16b) give the performance obtained in all gear ratios with foot-hard-down at 1000 rpm.

FIG. 16a) depicts the setpoint boost pressure (in dotted line) and measured boost pressure (in solid line). It may be seen that the dynamics of the responses are similar for all gear ratios. The final value changes because the setpoint boost pressure $P_{sural}^{SP}$ (full load) changes as a function of engine speed.

Figure 16B:
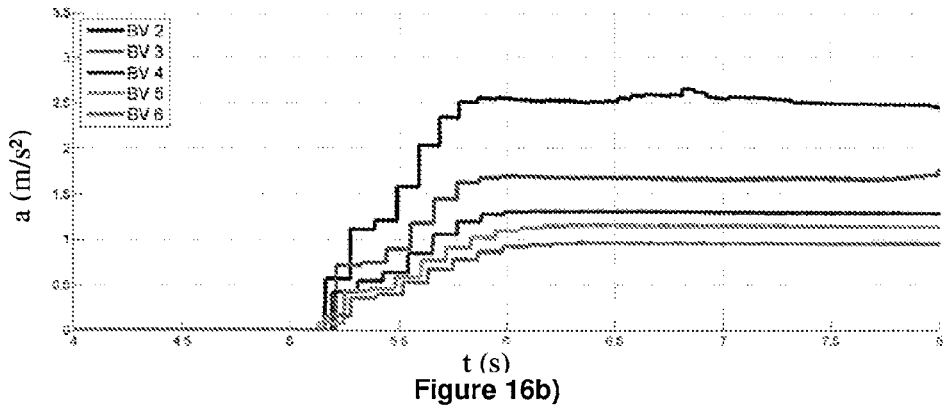

FIG. 16b) shows the corresponding vehicle acceleration for each of the gear ratios. Here too it may be seen that the acceleration is fairly rapid for all gear ratios.

Figure 17A:
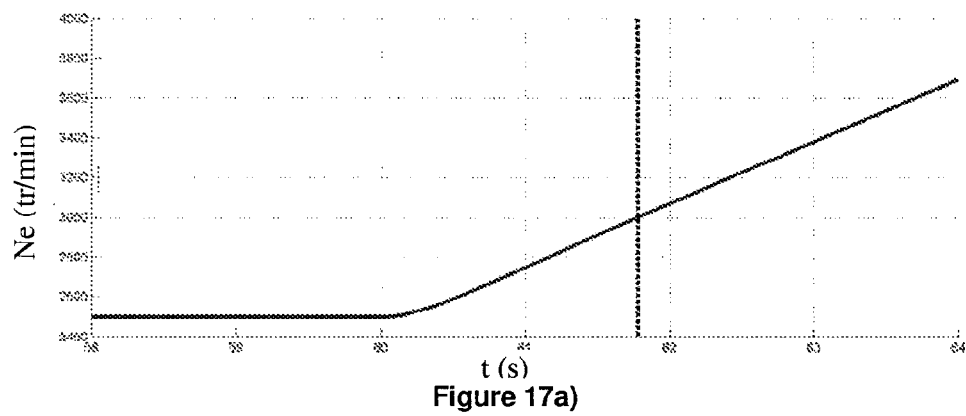
FIG. 17a) to 17c) correspond to FIG. 15a) to 15c) for an engine speed of 2500 rpm.

FIG. 17a) to 17c) show a full throttle in BV3 ($3^{rd}$ gear) at 2500 rpm. In each of the three figures, the vertical dotted line indicates the moment at which the speed exceeds 3000 rpm, which is the speed beyond which the mechanical compressor (3) has to be disengaged.

Figure 17B:
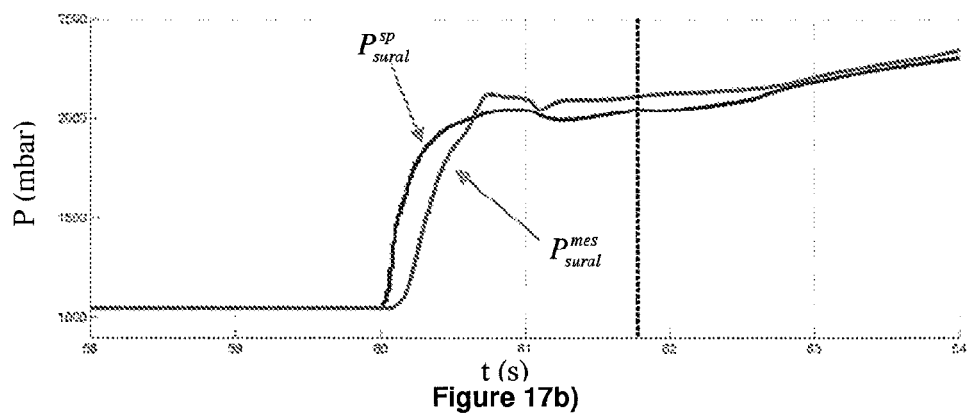

FIG. 17a) gives the evolution in engine speed. FIG. 17b) shows the setpoint boost pressure and measured boost pressure. It may be seen that the pressure transient is very rapid.

Figure 17C:
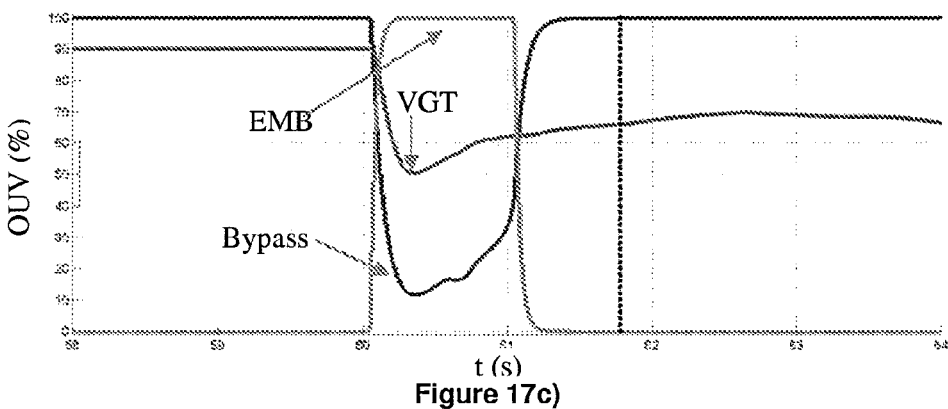

FIG. 17c) gives the position of the actuators which are the bypass valve (4), the VGT (2) and the clutch (11) of the mechanical compressor (3). It is seen that at the start of the transient, the compressor (3) is engaged, the bypass valve (4) closes to obtain the required boost pressure and the VGT (2) closes. After a certain length of time, the bypass valve (4) reopens and the mechanical compressor (3) is disengaged, the latter having become superfluous because the turbocharger (2) is capable on its own of achieving the boost pressure demanded.

Figure 18A:
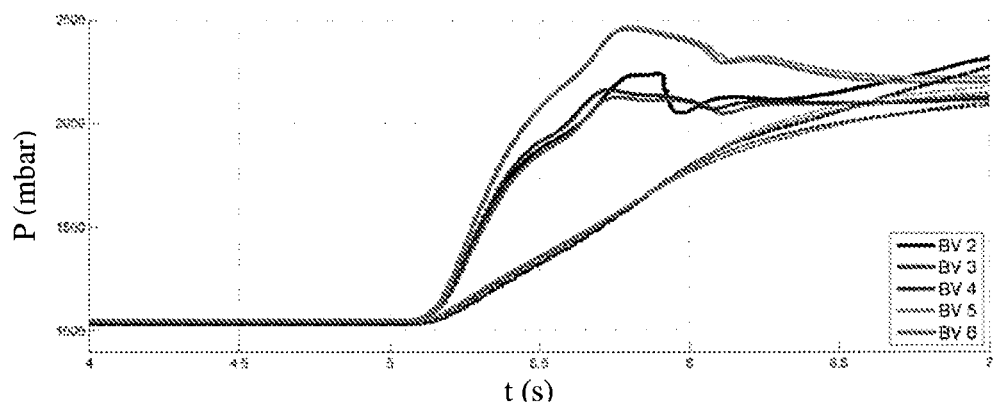
FIGS. 18a) and 18b) correspond to FIGS. 16a) and 16b) for an engine speed of 2500 rpm.

The transients at 2500 rpm do not require the use of the mechanical compressor (3) to achieve full load, as the latter can be provided by the turbocharger (2) alone. However, the control according to the invention does allow the mechanical compressor to be used in the transient phases in order to accelerate the boost pressure dynamics. FIGS. 18a) and 18b) provide a comparison between transient use of the mechanical compressor (solid line) and use of the turbocharger alone (dotted line) which would correspond to a basic control of the double supercharging.

Figure 18B:
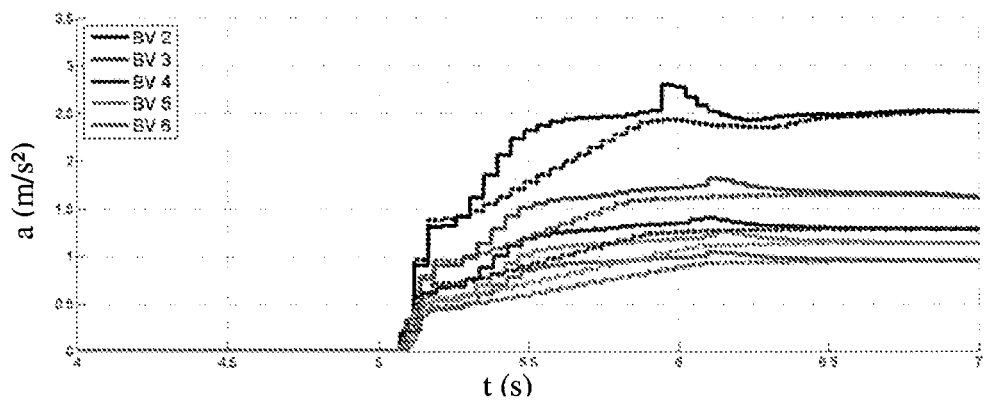

FIG. 18a) shows the boost pressure measurement and FIG. 18b) shows the corresponding vehicle acceleration a for each of the gear ratios. These two figures demonstrate the substantial improvement in responsiveness afforded by the dynamic strategy for controlling the double supercharging.

The invention claimed is:

1. A method for controlling a combustion engine equipped with a supercharging system including a turbocharger and a mechanical compressor for compressing a gaseous mixture on an intake side of the engine and a bypass circuit disposed in parallel with the mechanical compressor including a controlled bypass valve, comprising:
   a) acquiring a boost pressure setpoint;
   b) converting the boost pressure setpoint into an opening setpoint of the bypass valve by use of a filling model modelling filling of a supercharging boost volume disposed between intake valves of the engine and the mechanical compressor and the bypass valve; and
   c) controlling the bypass valve according to the opening setpoint of the bypass valve.

2. A method according to claim 1, comprising determining:
   a pressure and a temperature upstream of the mechanical compressor and a boost pressure and a boost temperature on an intake side of the engine; and wherein
   the filling model modelling filling of the supercharging boost volume links the boost pressure to opening of the bypass valve by use of the pressure and the temperature upstream of the mechanical compressor and the boost temperature.

3. A method according to claim 2, comprising:
   determining the boost pressure and the boost temperature by use of pressure and temperature sensors disposed upstream of an intake manifold of the engine.

4. A method according to claim 3, comprising:
   determining the pressure and the temperature upstream of the mechanical compressor by use of pressure and temperature sensors disposed upstream of the mechanical compressor.

5. A method according to claim 3, comprising:
   determining the pressure and the temperature upstream of the mechanical compressor by using an estimator which is dependent on the boost pressure and the boost temperature.

6. A method according to claim 3, comprising determining the filling model based on a filling equation expressing filling of the supercharging boost volume with a conservation-of-flow rate relationship:

$$\dot{P}_{sural} = \frac{RT_{sural}}{V_{sural}}(D_{cm} - D_{bp} - D_{asp})$$

where $\dot{P}_{sural}$ is the first derivative of the boost pressure $P_{sural}$ with respect to time, R is the perfect gas constant, $V_{sural}$ is the supercharging boost volume, $D_{cm}$ is a flow rate arriving from the mechanical compressor, $D_{bp}$ is a flow rate leaving through the bypass valve which is a function of opening of the bypass valve and $D_{asp}$ is an aspirated flow rate flowing toward cylinders of the engine.

7. A method according to claim 6, comprising determining the flow rate $D_{bp}$ flowing through the bypass valve determined from a pressure drop relationship:

$$D_{bp} = A_{bp}(\text{Bypass}) \cdot f(P_{avcm}, P_{surab}, T_{avcm})$$

where $A_{bp}^{(Bypass)}$ is an area of opening of the bypass valve and f is the flow rate per unit area defined by a formula:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1 - \left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is the ratio of mass heat capacities of the gases.

8. A method according to claim 6, wherein the filling model is an open-loop filling model expressed by a relationship:

$$Bypass^{sp} = A_{bp}^{-1}\left(\frac{1}{f(P_{avcm}, P_{sural}, T_{avcm})}\right.$$
$$\left. \left(-\frac{V_{sural}}{RT_{sural}}\dot{P}_{sural}^{sp} + \phi\left(r_{cm} \times Ne, \frac{P_{sural}^{sp} + \delta P(r_{cm} \times Ne, \rho_{cm})}{P_{avcm}}\right)\rho_{cm} - D_{asp}^{sp}\right)\right)$$

where $r_{cm}$ is reduction ratio between the mechanical compressor and a crankshaft of the engine, $\rho_{cm}$ is a density of the gases passing through the mechanical compressor as given by a relationship $$\rho_{cm} = \frac{P_{acvm}}{RT_{acvm}},$$

$\varphi$ is a volumetric flow rate of the mechanical compressor, $D_{asp}^{sp}$ is a setpoint for the flow rate of gas aspirated by cylinders of the engine, and $\delta P$ is a pressure drop in an air cooler located between the turbocharger and the mechanical compressor.

9. A method according to claim 2, comprising:
   determining the pressure and the temperature upstream of the mechanical compressor by use of pressure and temperature sensors disposed upstream of the mechanical compressor.

10. A method according to claim 9, comprising determining the filling model based on a filling equation expressing filling of the supercharging boost volume with a conservation-of-flow rate relationship:

$$\dot{P}_{sural} = \frac{RT_{sural}}{V_{sural}}(D_{cm} - D_{bp} - D_{asp})$$

where $\dot{P}_{sural}$ is the first derivative of the boost pressure $P_{sural}$ with respect to time, R is the perfect gas constant, $V_{sural}$ is the supercharging boost volume, $D_{cm}$ is a flow rate arriving from the mechanical compressor, $D_{bp}$ is a flow rate leaving through the bypass valve which is a function of opening of the bypass valve and $D_{asp}$ is an aspirated flow rate flowing toward cylinders of the engine.

11. A method according to claim 10 comprising determining the flow rate $D_{bp}$ flowing through the bypass valve determined from a pressure drop relationship:

$$D_{bp} = A_{bp}(\text{Bypass}) \cdot f(P_{avcm}, P_{sural}, T_{avcm})$$

where $A_{bp}^{(Bypass)}$ is an area of opening of the bypass valve and f is the flow rate per unit area defined by a formula:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where γ is the ratio of mass heat capacities of the gases.

12. A method according to claim 2, comprising:
determining the pressure and the temperature upstream of the mechanical compressor by using an estimator which is dependent on the boost pressure and the boost temperature.

13. A method according to claim 12, comprising determining the filling model based on a filling equation expressing filling of the supercharging boost volume with a conservation-of-flow rate relationship:

$$\dot{P}_{sural} = \frac{RT_{sural}}{V_{sural}}(D_{cm} - D_{bp} - D_{asp})$$

where $\dot{P}_{sural}$ is the first derivative of the boost pressure $P_{sural}$ with respect to time, R is the perfect gas constant, $V_{sural}$ is the supercharging boost volume, $D_{cm}$ is a flow rate arriving from the mechanical compressor, $D_{bp}$ is a flow rate leaving through the bypass valve which is a function of opening of the bypass valve and $D_{asp}$ is an aspirated flow rate flowing toward cylinders of the engine.

14. A method according to claim 13, comprising determining the flow rate $D_{bp}$ flowing through the bypass valve determined from a pressure drop relationship:

$$D_{bp} = A_{bp}(\text{Bypass}) \cdot f(P_{avcm}, P_{sural}, T_{avcm})$$

where $A_{bp}^{(Bypass)}$ is an area of opening of the bypass valve and f is the flow rate per unit area defined by a formula:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where γ is the ratio of mass heat capacities of the gases.

15. A method according to claim 2, comprising determining the filling model based on a filling equation expressing filling of the supercharging boost volume with a conservation-of-flow rate relationship:

$$\dot{P}_{sural} = \frac{RT_{sural}}{V_{sural}}(D_{cm} - D_{bp} - D_{asp})$$

where $\dot{P}_{sural}$ is the first derivative of th$\dot{P}$e boost pressure $P_{sural}$ with respect to time, R is the perfect gas constant, $V_{sural}$ is the supercharging boost volume, $D_{cm}$ is a flow rate arriving from the mechanical compressor, $D_{bp}$ is a flow rate leaving through the bypass valve which is a function of opening of the bypass valve and $D_{asp}$ is an aspirated flow rate flowing toward cylinders of the engine.

16. A method according to claim 15, comprising determining the flow rate $D_{bp}$ flowing through the bypass valve determined from a pressure drop relationship:

$$D_{bp} = A_{bp}(\text{Bypass}) \times f(P_{avcm}, P_{sural}, T_{avcm})$$

where $A_{bp}^{(Bypass)}$ is an area of opening of the bypass valve and f is the flow rate per unit area defined by a formula:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where γ is the ratio of mass heat capacities of the gases.

17. A method according to claim 16, wherein the filling model is an open-loop filling model expressed by a relationship:

$$Bypass^{sp} = A_{bp}^{-1}\left(\frac{1}{f(P_{avcm}, P_{sural}, T_{avcm})}\right.$$
$$\left. \left(-\frac{V_{sural}}{RT_{sural}}\dot{P}_{sural}^{sp} + \phi\left(r_{cm} \times Ne, \frac{P_{sural}^{sp} + \delta P(r_{cm} \times Ne, \rho_{cm})}{P_{avcm}}\right)\rho_{cm} - D_{asp}^{sp}\right)\right)$$

where $r_{cm}$ is reduction ratio between the mechanical compressor and a crankshaft of the engine, $\rho_{cm}$ is a density of the gases passing through the mechanical compressor as given by a relationship $$\rho_{cm} = \frac{P_{acvm}}{RT_{acvm}},$$

φ is a volumetric flow rate of the mechanical compressor, $D_{asp}^{sp}$ is a setpoint for the flow rate of gas aspirated by cylinders of the engine, and δP is a pressure drop in an air cooler located between the turbocharger and the mechanical compressor.

18. A method according to claim 16, wherein the filling model is a closed-loop filling model expressed by a relationship:

$$Bypass^{sp} = A_{bp}^{-1}\left(\frac{1}{f(P_{avcm}, P_{sural}^{sp}, T_{avcm})}\left(-\frac{V_{sural}}{RT_{sural}}\dot{P}_{sural}^{sp} + \delta_{PI} + \phi\left(r_{cm} \cdot Ne, \frac{P_{sural}^{sp} + \delta P(r_{cm} \cdot Ne, \rho_{cm})}{P_{avcm}}\right)\rho_{cm} - D_{asp}^{sp}\right)\right)$$

where $$\delta_{PI} = -K_p(P_{sural} - P_{sural}^{sp}) - K_i\int_0^t(P_{sural} - P_{sural}^{sp})dt,$$

$r_{cm}$ is a reduction ratio between the mechanical compressor and the crankshaft of the engine, $\rho_{cm}$ is a density of the gases passing through the mechanical compressor as given by the equation $$\rho_{cm} = \frac{P_{acvm}}{RT_{acvm}},$$

φ is a volumetric flow rate of the mechanical compressor, $D_{asp}^{sp}$ is a setpoint for a flow rate of gas aspirated by the cylinders of the engine, δP is a pressure drop in an air cooler located between the turbocharger and the mechanical compressor, and $K_i$ and $K_p$ are calibration parameters of a feedback loop.

19. A method according to claim 15, wherein the filling model is an open-loop filling model expressed by a relationship:

$$Bypass^{sp} = A_{bp}^{-1}\left(\frac{1}{f(P_{avcm}, P_{sural}, T_{avcm})}\right.$$
$$\left.\left(-\frac{V_{sural}}{RT_{sural}}\dot{P}_{sural}^{sp} + \phi\left(r_{cm} \times Ne, \frac{P_{sural}^{sp} + \delta P(r_{cm} \times Ne, \rho_{cm})}{P_{avcm}}\right)\rho_{cm} - D_{asp}^{sp}\right)\right)$$

where $r_{cm}$ is reduction ratio between the mechanical compressor and a crankshaft of the engine, $\rho_{cm}$ is a density of the gases passing through the mechanical compressor as given by a relationship $$\rho_{cm} = \frac{P_{acvm}}{RT_{acvm}},$$

φ is a volumetric flow rate of the mechanical compressor, $D_{asp}^{sp}$ is a setpoint for the flow rate of gas aspirated by cylinders of the engine, and δP is a pressure drop in an air cooler located between the turbocharger and the mechanical compressor.

20. A method according to claim 15, wherein the filling model is a closed-loop filling model expressed by a relationship:

$$Bypass^{sp} = A_{bp}^{-1}\left(\frac{1}{f(P_{avcm}, P_{sural}^{sp}, T_{avcm})}\left(-\frac{V_{sural}}{RT_{sural}}\dot{P}_{sural}^{sp} + \delta_{PI} + \phi\left(r_{cm} \cdot Ne, \frac{P_{sural}^{sp} + \delta P(r_{cm} \cdot Ne, \rho_{cm})}{P_{avcm}}\right)\rho_{cm} - D_{asp}^{sp}\right)\right)$$

where $$\delta_{PI} = -K_p(P_{sural} - P_{sural}^{sp}) - K_i\int_0^t(P_{sural} - P_{sural}^{sp})dt,$$

$r_{cm}$ is a reduction ratio between the mechanical compressor and a crankshaft of the engine, $\rho_{cm}$ is a density of the gases passing through the mechanical compressor as given by an equation $$\rho_{cm} = \frac{P_{acvm}}{RT_{acvm}},$$

φ is a volumetric flow rate of the mechanical compressor, $D_{asp}^{sp}$ is a setpoint for a flow rate of gas aspirated by the cylinders of the engine, δP is a pressure drop in an air cooler located between the turbocharger and the mechanical compressor, and $K_i$ and $K_p$ are calibration parameters of a feedback loop.

21. A method according to claim 1, wherein the mechanical compressor is driven by an electrical motor.

22. A method according to claim 1, wherein the mechanical compressor is driven by a crankshaft of the engine by a reduction gear and a clutch controlled as a function of the opening setpoint of the bypass valve.

23. A method according to claim 22, wherein the clutch is controlled by steps comprising:
  i) determining the engine speed; and
  ii) controlling the clutch so that
    if the opening setpoint of the bypass valve corresponds to an incomplete opening of the bypass valve and if the engine speed is below a predetermined threshold, then the clutch is engaged; or
    if not, the clutch is disengaged.

24. A method according to claim 23, wherein the predetermined threshold is determined as a function of a maximum speed of the mechanical compressor and a reduction ratio between the crankshaft and the mechanical compressor.

* * * * *